United States Patent
Chakraborty et al.

(10) Patent No.: US 11,202,284 B2
(45) Date of Patent: Dec. 14, 2021

(54) TECHNIQUES FOR SEARCH SPACE MANAGEMENT

(71) Applicant: QUALCOMM Incorporated, San Diego, CA (US)

(72) Inventors: Kaushik Chakraborty, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 16/570,820

(22) Filed: Sep. 13, 2019

(65) Prior Publication Data

US 2020/0100222 A1 Mar. 26, 2020

Related U.S. Application Data

(60) Provisional application No. 62/734,735, filed on Sep. 21, 2018.

(51) Int. Cl.
*H04W 72/04* (2009.01)
*H04W 52/02* (2009.01)
*H04W 72/12* (2009.01)

(52) U.S. Cl.
CPC ..... *H04W 72/042* (2013.01); *H04W 52/0229* (2013.01); *H04W 72/046* (2013.01); *H04W 72/121* (2013.01); *H04W 72/1273* (2013.01)

(58) Field of Classification Search
CPC ............. H04W 72/042; H04W 72/046; H04W 52/0229; H04W 72/1273; H04W 72/121;

(Continued)

(56) References Cited

U.S. PATENT DOCUMENTS

2018/0198677 A1* 7/2018 Blankenship ....... H04W 72/044
2019/0191459 A1* 6/2019 Kim ...................... H04W 16/14

OTHER PUBLICATIONS

Fujitsu: "On Flexible Starting Positions and Related PDCCH Monitoring for NR-U", 3GPP Draft, 3GPP TSG RAN WG1 Meeting #93, R1-1808291 lexible Starting Positions V1.0,3rd Generation Partnership Project (3GPP), Mobile Competence Centre, 650, Route Des Lucioles, F-06921 Sophia-Antipolis Cedex, France, vol. RAN WG1, No. Gothenburg, Sweden, 20180820-20180824, Aug. 10, 2018 (Aug. 10, 2018), XP051515674, 3 Pages, Retrieved from the Internet: URL:http://www.3gpp.org/ftpjtsg%5Fran/WG1%5FRL1/TSGR1%5F94/Docs/R1%2D1808291%2 Ezip [retrieved on Aug. 10, 2018] the whole document.

(Continued)

*Primary Examiner* — Walter J Divito
(74) *Attorney, Agent, or Firm* — Holland & Hart LLP

(57) ABSTRACT

Methods, systems, and devices for using a common physical downlink control channel (PDCCH) to indicate transmission beams to be used by a base station during a transmission opportunity or a periodicity to monitor search spaces are described. A user equipment (UE) may monitor a search space (in some cases, using a periodicity) for the common PDCCH to determine if transmission beams associated with the UE are to be used during the transmission opportunity. If so, the UE may wake-up during at least a portion of the transmission opportunity to receive additional information. If the common PDCCH indicates that no transmission beams associated with the UE are to be used during the transmission opportunity, the UE may enter or re-enter the sleep state. The UE may switch to a new periodicity for monitoring the search space based on the information transmitted within the common PDCCH.

30 Claims, 23 Drawing Sheets

(58) Field of Classification Search
CPC .......... H04W 74/0808; H04W 52/0216; Y02D 30/70; H04L 5/0091; H04L 5/0023; H04B 7/088; H04B 7/0695; H04B 7/0408
See application file for complete search history.

(56) References Cited

OTHER PUBLICATIONS

International Search Report and Written Opinion—PCT/US2019/051326—ISA/EPO—dated Jan. 8, 2020 (184876WO).
LG Electronics: "Summary #2 on Frame Structure for NR-U", 3GPP Draft, 3GPP TSG RAN WG1 Meeting #94, R1-1809972, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, 20180820-20180824, Aug. 25, 2018 (Aug. 25, 2018), XP051517329, 15 Pages, Retrieved from the Internet: URL:http://www.3gpp.org/ftp/tsg%5Fran/WG1%5FRL1/TSGR1%5F94/Docs/R1%2D1809972%2Ezip [retrieved on Aug. 25, 2018], the whole document.
Nokia et al., "Frame Structure for NR-U Operation", 3GPP Draft, 3GPP TSG RAN WG1 Meeting #94, R1-1808817 Frame Structure, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, 20180820-20180824, Aug. 10, 2018 (Aug. 10, 2018), XP051516190, 7 Pages,Retrieved from the Internet: URL:http://www.3gpp.org/ftp/tsg%5Fran/WG1%5FRL1/TSGR1%5F94/Docs/R1%2D1808817%2Ezip [retrieved on Aug. 10, 2018] the whole document.
QUALCOMM Incorporated: "Views on UE Power Saving," 3GPP Draft, 3GPP TSG RAN WG1 Meeting #94, R1-1809462 Views on UE Power Saving, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, 20180820-20180824, Aug. 17, 2018, XP051516827, 12 Pages, Retrieved from the Internet: URL: http://www.3gpp.org/ftp/tsg%5Fran/WG1%5FRL1/TSGR1%5F94/Docs/R1%2D1809462%2Ezip [retrieved on Aug. 17, 2018].
Ericsson: "On Beam Indication, Measurement, and Reporting", 3GPP DRAFT; R1-1716350 On Beam Indication, Measurement, and Reporting, 3rd Generation Partnership Project (3GPP), Mobile Competence Centre; 650, Route Des Lucioles; F-06921 Sophia-Antipolis Cedex; France, vol. RAN WG1, No. Nagoya, Japan; 20170918-20170921 Sep. 17, 2017, XP051339805, Retrieved from the Internet: URL:http://www.3gpp.org/ftp/Meetings_3GPP_SYNC/RAN1/Docs/ [retrieved on Sep. 17, 2017], section 3, 13 pages.
Huawei et al., "Further Details on Beam Indication", 3GPP Draft, R1-1719806, 3GPP TSG RAN WG1 Meeting #91,3RD Generation Partnership Project (3GPP), Mobile Competence Centre, 650, Route Des Lucioles, F-06921 Sophia-Antipolis Cedex, France, vol. RAN WG1, No. Reno, USA, 20171127-20171201 Nov. 17, 2017 (Nov. 17, 2017), XP051369186, 12 Pages, Retrieved from the Internet: URL:http://www.3gpp.org/ftp/tsg%5Fran/WG1%5FRL1/TSGR1%5F91/Docs/ [retrieved on Nov. 17, 2017] the whole document.
Intel Corporation: "Remaining Issues on Beam Management", 3GPP Draft; R1-1808669 Remaining Issues On BM, 3RD Generation Partnership Project (3GPP), Mobile Competence Centre; 650, Route Des Lucioles ; F-06921, Sophia-Antipolis Cedex; France, vol. RAN WG1, No. Gothenburg, Sweden; 20180820-20180824, Aug. 11, 2018 (Aug. 11, 2018), XP051516045, 16 Pages, Retrieved from the Internet: URL:http://www.3gpp.org/ftp/tsg%5Fran/WG1%5FRL1/TSGR1%5F94/Docs/R1%2D1808669%2Ezip [retrieved on Aug. 11, 2018].
Partial International Search Report—PCT/US2019/051326—ISA/EPO—dated Nov. 11, 2019 (184876WO).
Samsung: "On Beam Indication", 3GPP Draft, R1-1717627 On Beam Indication_V1, 3RD Generation Partnership Project (3GPP), Mobile Competence Centre, 650, Route Des Lucioles, F-06921 Sophia-Antipolis Cedex, France, vol. RAN WG1, No. Prague, CZ, 20171009-20171013, Oct. 8, 2017 (Oct. 8, 2017), XP051340813, 9 Pages, Retrieved from the Internet: URL:http://www.3gpp.org/ftp/Meetings_3GPP_SYNC/RAN1/Docs/[retrieved on Oct. 8, 2017].

* cited by examiner

TECHNIQUES FOR SEARCH SPACE MANAGEMENT

CROSS REFERENCE

The present application for patent claims the benefit of U.S. Provisional Patent Application No. 62/734,735 by CHAKRABORTY et al., entitled "TECHNIQUES FOR SEARCH SPACE MANAGEMENT," filed Sep. 21, 2018, assigned to the assignee hereof, and expressly incorporated by reference herein.

BACKGROUND

The following relates generally to wireless communications, and more specifically to techniques for search space management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, UEs may be configured to enter a sleep state to conserve power. UEs may periodically monitor search spaces to determine if the UE should enter an active state. Improved techniques for monitoring search spaces are desired.

SUMMARY

The described techniques relate to improved methods, systems, devices, and apparatuses that support techniques for search space management. Generally, the described techniques relate to using a common physical downlink control channel (PDCCH) to indicate the transmission beams to be used by the base station during a transmission opportunity. A user equipment (UE) may monitor a search space for the common PDCCH to determine if transmission beams associated with the UE are to be used during the transmission opportunity. If so, the UE may wake-up during at least a portion of the transmission opportunity to receive additional information. For example, the UE may monitor one or more PDCCHs (e.g., other PDCCHs) during the transmission opportunity based on the common PDCCH indicating that transmission beams associated with the UE are to be used during the transmission opportunity. If the common PDCCH indicates that no transmission beams associated with the UE are to be used during the transmission opportunity, the UE may enter the sleep state.

A method of wireless communication at a UE is described. The method may include monitoring a search space for a common physical downlink control channel associated with a transmission opportunity, identifying at least one transmission beam for use by a base station during the transmission opportunity based on the common physical downlink control channel, and receiving information using the at least one transmission beam during the transmission opportunity.

An apparatus for wireless communication at a UE is described. The apparatus may include a processor, memory in electronic communication with the processor, and instructions stored in the memory. The instructions may be executable by the processor to cause the apparatus to monitor a search space for a common physical downlink control channel associated with a transmission opportunity, identify at least one transmission beam for use by a base station during the transmission opportunity based on the common physical downlink control channel, and receive information using the at least one transmission beam during the transmission opportunity.

Another apparatus for wireless communication at a UE is described. The apparatus may include means for monitoring a search space for a common physical downlink control channel associated with a transmission opportunity, identifying at least one transmission beam for use by a base station during the transmission opportunity based on the common physical downlink control channel, and receiving information using the at least one transmission beam during the transmission opportunity.

A non-transitory computer-readable medium storing code for wireless communication at a UE is described. The code may include instructions executable by a processor to monitor a search space for a common physical downlink control channel associated with a transmission opportunity, identify at least one transmission beam for use by a base station during the transmission opportunity based on the common physical downlink control channel, and receive information using the at least one transmission beam during the transmission opportunity.

Some examples of the method, apparatuses, and non-transitory computer-readable medium described herein may further include operations, features, means, or instructions for transitioning from a sleep state to an active state based on identifying the at least one transmission beam, where receiving the information may be based on transitioning form the sleep state to the active state.

Some examples of the method, apparatuses, and non-transitory computer-readable medium described herein may further include operations, features, means, or instructions for determining that the at least one transmission beam may be to be used to communicate information with the UE during the transmission opportunity, where transitioning from the sleep state to the active state may be based on determining that the at least one transmission beam may be to be used to communicate information with the UE during the transmission opportunity.

Some examples of the method, apparatuses, and non-transitory computer-readable medium described herein may further include operations, features, means, or instructions for identifying an identifier of a group of UEs scheduled to receive information during the transmission opportunity included in the common physical downlink control channel, where transitioning from the sleep state to the active state may be based on identifying the group of UEs scheduled to receive information during the transmission opportunity.

Some examples of the method, apparatuses, and non-transitory computer-readable medium described herein may further include operations, features, means, or instructions for identifying a transmission configuration indicator (TCI) based on the common physical downlink control channel, where transitioning from the sleep state to the active state may be based on identifying the TCI.

Some examples of the method, apparatuses, and non-transitory computer-readable medium described herein may further include operations, features, means, or instructions for identifying a group of UEs scheduled to receive information during the transmission opportunity based on the TCI included in the common physical downlink control channel, where identifying the at least one transmission beam may be based on identifying the group of UEs scheduled to receive information during the transmission opportunity.

In some examples of the method, apparatuses, and non-transitory computer-readable medium described herein, there may be a one-to-one mapping between TCIs and groups of UEs.

Some examples of the method, apparatuses, and non-transitory computer-readable medium described herein may further include operations, features, means, or instructions for monitoring a second search space associated with the transmission opportunity based on identifying the at least one transmission beam, where receiving the information using the at least one transmission beam during the transmission opportunity may be based on monitoring the second search space.

In some examples of the method, apparatuses, and non-transitory computer-readable medium described herein, monitoring the second search space may include operations, features, means, or instructions for dynamically activating at least a portion of the UE based on the common physical downlink control channel.

In some examples of the method, apparatuses, and non-transitory computer-readable medium described herein, monitoring the search space may include operations, features, means, or instructions for monitoring the search space on a primary cell, the method further including.

In some examples of the method, apparatuses, and non-transitory computer-readable medium described herein, the primary cell may be a sub-6 gigahertz cell and the secondary cell may be a millimeter wave (mmW) cell.

Some examples of the method, apparatuses, and non-transitory computer-readable medium described herein may further include operations, features, means, or instructions for receiving a set of beams that include the common physical downlink control channel based on monitoring the search space, where identifying the at least one transmission beam may be based on receiving at least one of the set of beams that includes the common physical downlink control channel.

Some examples of the method, apparatuses, and non-transitory computer-readable medium described herein may further include operations, features, means, or instructions for identifying a periodicity for monitoring the search space different than a current periodicity for monitoring the search space based on the common physical downlink control channel and monitoring a second search space based on identifying the periodicity.

Some examples of the method, apparatuses, and non-transitory computer-readable medium described herein may further include operations, features, means, or instructions for receiving the common physical downlink control channel based on monitoring the search space, where identifying the at least one transmission beam may be based on receiving the common physical downlink control channel.

Some examples of the method, apparatuses, and non-transitory computer-readable medium described herein may further include operations, features, means, or instructions for entering, by the UE, a sleep state to conserve power, where monitoring the search space may be based on entering the sleep state.

Some examples of the method, apparatuses, and non-transitory computer-readable medium described herein may further include operations, features, means, or instructions for identifying a second transmission beam that will not be used by the base station during the transmission opportunity based on the common physical downlink control channel, determining that the second transmission beam may be associated with the UE and transitioning from an active state to a sleep state based on identifying the second transmission beam that will not be used by the base station during the transmission opportunity and determining that the second transmission beam may be associated with the UE.

In some examples of the method, apparatuses, and non-transitory computer-readable medium described herein, the common physical downlink control channel indicates a set of transmission beams for use during the transmission opportunity, the set of transmission beams including the at least one transmission beam.

Some examples of the method, apparatuses, and non-transitory computer-readable medium described herein may further include operations, features, means, or instructions for monitoring a second search space for a second common physical downlink control channel associated with a second transmission opportunity, identifying a second transmission beam that will not be used by the base station during the second transmission opportunity based on the second common physical downlink control channel and transitioning from an active state to a sleep state based on identifying the second transmission beam.

In some examples of the method, apparatuses, and non-transitory computer-readable medium described herein, the search space includes at least a portion of a control resource set.

In some examples of the method, apparatuses, and non-transitory computer-readable medium described herein, the transmission opportunity may be in the shared radio frequency spectrum.

A method of wireless communication by a base station is described. The method may include identifying at least one transmission beam and information for a transmission to a UE, transmitting a common physical downlink control channel including an indication of the at least one transmission beam to the UE, and transmitting the information to the UE using the at least one transmission beam during a transmission opportunity based at least in part on transmitting the common physical downlink control channel.

An apparatus for wireless communication by a base station is described. The apparatus may include a processor, memory in electronic communication with the processor, and instructions stored in the memory. The instructions may be executable by the processor to cause the apparatus to identify at least one transmission beam and information for a transmission to a UE, transmit a common physical downlink control channel including an indication of the at least one transmission beam to the UE, and transmit the information to the UE using the at least one transmission beam during a transmission opportunity based at least in part on transmitting the common physical downlink control channel.

Another apparatus for wireless communication by a base station is described. The apparatus may include means for identifying at least one transmission beam and information for a transmission to a UE, transmitting a common physical downlink control channel including an indication of the at least one transmission beam to the UE, and transmitting the information to the UE using the at least one transmission beam during a transmission opportunity based at least in part on transmitting the common physical downlink control channel.

A non-transitory computer-readable medium storing code for wireless communication by a base station is described. The code may include instructions executable by a processor to identify at least one transmission beam and information for a transmission to a UE, transmit a common physical downlink control channel including an indication of the at least one transmission beam to the UE, and transmit the information to the UE using the at least one transmission beam during a transmission opportunity based at least in part on transmitting the common physical downlink control channel.

In some examples of the method, apparatuses, and non-transitory computer-readable medium described herein, the common physical downlink control channel includes an indication signal for the UE to determine whether the UE may be to monitor subsequent dedicated PDCCH monitoring occasions based on identifying the at least one transmission beam included in the common physical downlink control channel.

Some examples of the method, apparatuses, and non-transitory computer-readable medium described herein may further include operations, features, means, or instructions for identifying a group of UEs that include the UE based on identifying the information waiting to be transmitted to the UE, where the common physical downlink control channel includes an indication of the group of UEs.

Some examples of the method, apparatuses, and non-transitory computer-readable medium described herein may further include operations, features, means, or instructions for identifying a transmission configuration indicator (TCI) associated with the UE based on identifying the information waiting to be transmitted to the UE, where the common physical downlink control channel includes an indication of the TCI.

In some examples of the method, apparatuses, and non-transitory computer-readable medium described herein, there may be a one-to-one mapping between TCIs and groups of UEs.

Some examples of the method, apparatuses, and non-transitory computer-readable medium described herein may further include operations, features, means, or instructions for performing an initialization procedure to associate one or more transmission beams with the UE or a group of UEs, the one or more transmission beams for use to communicate information with the UE or the group of UEs during the transmission opportunity, where identifying the at least one transmission beam may be based on performing the initialization procedure.

In some examples of the method, apparatuses, and non-transitory computer-readable medium described herein, transmitting the common physical downlink control channel may include operations, features, means, or instructions for transmitting the common physical downlink control channel that includes a list of a plurality of transmission beams the base station intends to use during the transmission opportunity to transmit information with a plurality of UEs.

In some examples of the method, apparatuses, and non-transitory computer-readable medium described herein, transmitting the common physical downlink control channel may include operations, features, means, or instructions for transmitting the common physical downlink control channel over a primary cell, where transmitting the information includes transmitting the information over a secondary cell.

In some examples of the method, apparatuses, and non-transitory computer-readable medium described herein, the primary cell may be a sub-6 gigahertz cell and the secondary cell may be a millimeter wave (mmW) cell.

Some examples of the method, apparatuses, and non-transitory computer-readable medium described herein may further include operations, features, means, or instructions for transmitting a set of beams that include the common physical downlink control channel in a beam sweeping pattern, where transmitting the set of beams includes transmitting the common physical downlink control channel.

Some examples of the method, apparatuses, and non-transitory computer-readable medium described herein may further include operations, features, means, or instructions for identifying a periodicity for the UE to monitor a search space different than a current periodicity, where the common physical downlink control channel includes an indication of the periodicity.

In some examples of the method, apparatuses, and non-transitory computer-readable medium described herein, the search space includes at least a portion of a control resource set.

Some examples of the method, apparatuses, and non-transitory computer-readable medium described herein may further include operations, features, means, or instructions for identifying a second transmission beam that will not be used during the transmission opportunity based on identifying the information, where the common physical downlink control channel includes an indication of the second transmission beam.

In some examples of the method, apparatuses, and non-transitory computer-readable medium described herein, the transmission opportunity may be in the shared radio frequency spectrum.

A method of wireless communication at a UE is described. The method may include monitoring, using a first periodicity, a search space for a common physical downlink control channel associated with a transmission opportunity, detecting the common physical downlink control channel based on monitoring the search space using the first periodicity, identifying a second periodicity for monitoring the search space based on information included in the common physical downlink control channel, and monitoring, using the second periodicity, the search space for a second common physical downlink control channel based on identifying the second periodicity.

An apparatus for wireless communication at a UE is described. The apparatus may include a processor, memory in electronic communication with the processor, and instructions stored in the memory. The instructions may be executable by the processor to cause the apparatus to monitor, using a first periodicity, a search space for a common physical downlink control channel associated with a transmission opportunity, detect the common physical downlink control channel based on monitoring the search space using the first periodicity, identify a second periodicity for monitoring the search space based on information included in the common physical downlink control channel, and monitor, using the second periodicity, the search space for a second common physical downlink control channel based on identifying the second periodicity.

Another apparatus for wireless communication at a UE is described. The apparatus may include means for monitoring, using a first periodicity, a search space for a common physical downlink control channel associated with a transmission opportunity, detecting the common physical downlink control channel based on monitoring the search space using the first periodicity, identifying a second periodicity for monitoring the search space based on information included in the common physical downlink control channel, and monitoring, using the second periodicity, the search space for a second common physical downlink control channel based on identifying the second periodicity.

A non-transitory computer-readable medium storing code for wireless communication at a UE is described. The code may include instructions executable by a processor to monitor, using a first periodicity, a search space for a common physical downlink control channel associated with a transmission opportunity, detect the common physical downlink control channel based on monitoring the search space using the first periodicity, identify a second periodicity for monitoring the search space based on information included in the common physical downlink control channel, and monitor, using the second periodicity, the search space for a second common physical downlink control channel based on identifying the second periodicity.

Some examples of the method, apparatuses, and non-transitory computer-readable medium described herein may further include operations, features, means, or instructions for determining that a duration since the common physical downlink control channel may be detected satisfies a threshold, where identifying the second periodicity may be based on the duration satisfying the threshold.

Some examples of the method, apparatuses, and non-transitory computer-readable medium described herein may further include operations, features, means, or instructions for determining that at least a portion of the transmission opportunity includes information for the UE, where identifying the second periodicity may be based on identifying that the portion of the transmission opportunity includes information for the UE.

In some examples of the method, apparatuses, and non-transitory computer-readable medium described herein, detecting the common physical downlink control channel may include operations, features, means, or instructions for detecting that the common physical downlink control channel indicates the second periodicity.

In some examples of the method, apparatuses, and non-transitory computer-readable medium described herein, the first periodicity includes monitoring the search space once per mini-slot and the second periodicity includes monitoring the search space once per slot.

A method of wireless communication at a base station is described. The method may include identifying information for transmitting to a UE, identifying a periodicity for the UE to monitor a search space, the periodicity different than a current periodicity, transmitting, to the UE, a common physical downlink control channel that includes an indication of the periodicity, and transmitting, to the UE, the information during a transmission opportunity based at least in part on transmitting the common physical downlink control channel.

An apparatus for wireless communication at a base station is described. The apparatus may include a processor, memory in electronic communication with the processor, and instructions stored in the memory. The instructions may be executable by the processor to cause the apparatus to identify information for transmitting to a UE, identify a periodicity for the UE to monitor a search space, the periodicity different than a current periodicity, transmit, to the UE, a common physical downlink control channel that includes an indication of the periodicity, and transmit, to the UE, the information during a transmission opportunity based at least in part on transmitting the common physical downlink control channel.

Another apparatus for wireless communication at a base station is described. The apparatus may include means for identifying information for transmitting to a UE, identifying a periodicity for the UE to monitor a search space, the periodicity different than a current periodicity, transmitting, to the UE, a common physical downlink control channel that includes an indication of the periodicity, and transmitting, to the UE, the information during a transmission opportunity based at least in part on transmitting the common physical downlink control channel.

A non-transitory computer-readable medium storing code for wireless communication at a base station is described. The code may include instructions executable by a processor to identify information for transmitting to a UE, identify a periodicity for the UE to monitor a search space, the periodicity different than a current periodicity, transmit, to the UE, a common physical downlink control channel that includes an indication of the periodicity, and transmit, to the UE, the information during a transmission opportunity based at least in part on transmitting the common physical downlink control channel.

Some examples of the method, apparatuses, and non-transitory computer-readable medium described herein may further include operations, features, means, or instructions for identifying at least one transmission beam for communicating the information by the base station, where the common physical downlink control channel includes a second indication of the at least one transmission beam.

Some examples of the method, apparatuses, and non-transitory computer-readable medium described herein may further include operations, features, means, or instructions for determining that at least a portion of the transmission opportunity includes information for the UE, where identifying the periodicity may be based on identifying that the portion of the transmission opportunity includes information for the UE.

In some examples of the method, apparatuses, and non-transitory computer-readable medium described herein, the current periodicity includes monitoring the search space once every mini-slot and the periodicity includes monitoring the search space once every slot.

DETAILED DESCRIPTION

In wireless communications systems that use directional beams, certain control information may be included in common physical downlink control channels (PDCCHs) received by at least some if not every UE and other control information may be included in other PDCCHs. For example, in some wireless communications systems, information about which transmission beams are to be used during a transmission opportunity may be communicated as part of a PDCCH. In such configurations, UEs in the wireless communications system may monitor at least some if not every search space that may include a PDCCH to make sure the UEs do not miss any control information.

Techniques are described herein for using a common PDCCH to indicate one or more transmission beams to be used by the base station during a transmission opportunity. The UEs may monitor a search space for the common PDCCH to determine which beams are to be used during a transmission opportunity. If the common PDCCH indicates that the transmission beams associated with the UE are to be used during the transmission opportunity, the UE may change states (e.g., wake-up) during at least a portion of the transmission opportunity to receive additional information. For example, the UE may monitor other PDCCHs during the transmission opportunity based on the common PDCCH indicating that transmission beams associated with the UE are to be used during the transmission opportunity. If the common PDCCH indicates that no transmission beams associated with the UE are to be used during the transmission opportunity, the UE may enter or re-enter the sleep state (e.g., a power conservation state). By incorporating information about the transmission beams to be used during the transmission opportunity, at least some UEs may be configured to conserve power during a transmission opportunity by entering or re-entering a sleep state.

Aspects of the disclosure are initially described in the context of wireless communications systems. Aspects of the disclosure are also described in the context of timing diagrams and flow diagrams. Aspects of the disclosure are further illustrated by and described with reference to apparatus diagrams, system diagrams, and flowcharts that relate to techniques for search space management.

Figure 1:
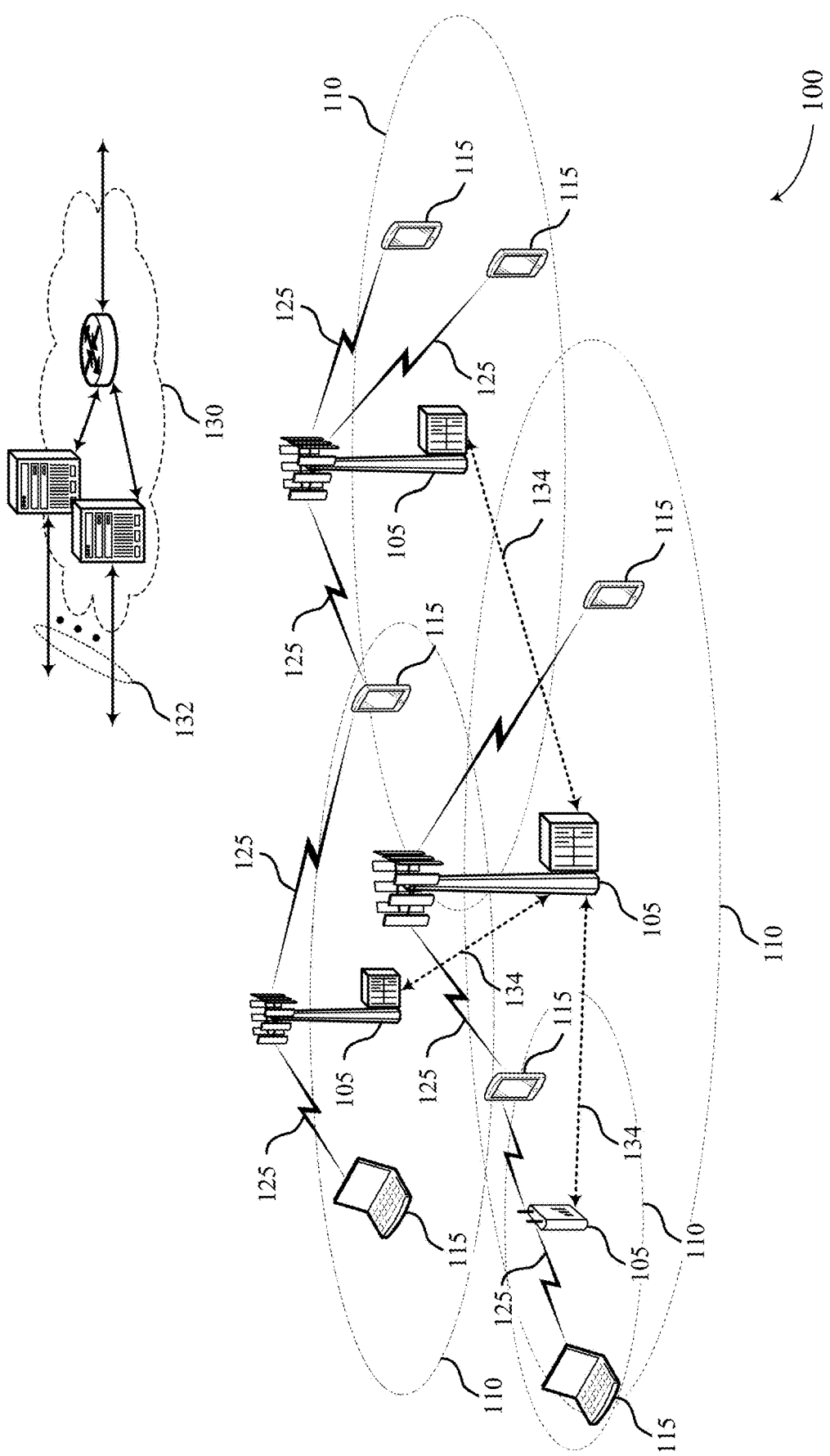
FIG. 1 illustrates an example of a system for wireless communications that supports techniques for search space management in accordance with aspects of the present disclosure.

FIG. 1 illustrates an example of a wireless communications system 100 that supports techniques for search space management in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The base station 105 may be configured to communicate one or more transmission beams that may be used during a transmission opportunity using a common PDCCH. Using the transmission beam information, the UE 115 may be configured to evaluate whether the UE 115 should activate monitoring of other search spaces and/or transition from a sleep state to an active state for at least a portion of a transmission opportunity. Other related aspects are also described in different parts of present disclosure.

Figure 2:
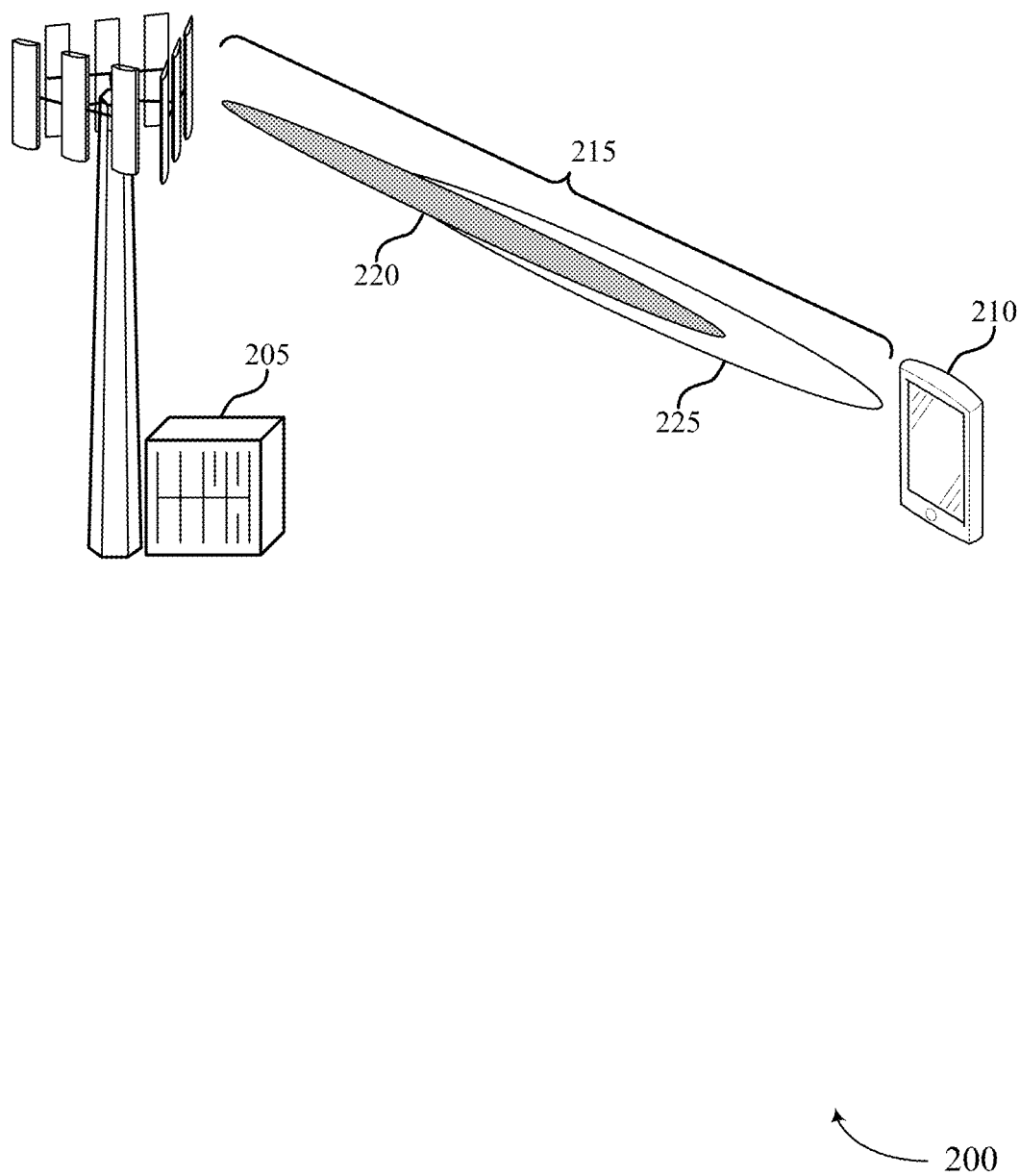
FIG. 2 illustrates an example of a wireless communications system that supports techniques for search space management in accordance with aspects of the present disclosure.

FIG. 2 illustrates an example of a wireless communications system 200 that supports techniques for search space management in accordance with various aspects of the present disclosure. In some examples, the wireless communications system 200 may implement aspects of wireless communications system 100. The wireless communications system 200 includes communications between a base station 205 and a UE 210. The base station 205 may be an example of the base stations 105 described with reference to FIG. 1. The UE 210 may be an example of the UEs 115 described with reference to FIG. 1.

In the wireless communications system 200, the base station 205 and the UE 210 may establish a communication link (e.g., using a beam pair link 215). As one example of establishing a communication link, the beam pair link 215 may include a transmission beam formed by the transmitting entity and directional listening implemented by the receiving entity. For example, in downlink communications, the base station 205 may use a phased-array antenna to form a directional transmission beam 220 and the UE 210 may use directional listening 225. In some cases, the direction listening beam 225 or transmission beam 220 formed by the UE 210 may be larger than a transmission beam 220 or direction listening formed by the base station 205 because the base station 205 has a larger array of antennas to do beamforming. In uplink communications, the roles of the base station 205 and the UE 210 may be reversed. In some cases, the wireless communications system 200 may operate in a shared radio frequency band spectrum. As such, the wireless communications system 200 may use contention-based protocol to gain access communication resources.

In the wireless communications system 200, the UE 210 may be configured to go into a sleep state (e.g., a state of operation of the UE 210 configured to conserve power of the UE 210). In such a state, the UE 210 may periodically monitor search spaces for control information. Based on the monitoring, the UE 210 may determine whether information is to be communicated with the UE 210 during a transmission opportunity.

In wireless communications systems that use directional beams, certain control information may be included in common PDCCHs received by at least some if not every UE and other control information may be included in UE-specific PDCCHs that are addressed to one or more specific UEs. For example, in some wireless communications systems, information about which transmission beams are to be used during a transmission opportunity may be communicated as part of a UE-specific PDCCH. In such configurations, UEs in the wireless communications system may monitor at least some if not every search space that may include a UE-specific PDCCH to make sure the UEs do not miss any control information.

Techniques are described herein for using a common PDCCH to indicate the transmission beams to be used by the base station 205 during a transmission opportunity. The UEs 210 may monitor a search space for the common PDCCH to determine which beams are to be used during a transmission opportunity. If the common PDCCH indicates that the transmission beams associated with the UE 210 are to be used during the transmission opportunity, the UE 210 may wake-up during at least a portion of the transmission opportunity to receive additional information. For example, the UE 210 may monitor other UE-specific PDCCHs during the transmission opportunity based on the common PDCCH indicating that transmission beams associated with the UE 210 are to be used during the transmission opportunity. If the common PDCCH indicates that no transmission beams associated with the UE 210 are to be used during the transmission opportunity, the UE 210 may enter (or re-enter) the sleep state. By incorporating information about the transmission beams to be used during the transmission opportunity, at least some UEs may be configured to conserve power during a transmission opportunity by entering or re-entering a sleep state. In some cases, a common PDCCH may include an indication of a start of a transmission opportunity, among other information.

In some cases, one (or a subset) of search spaces may be designated as an anchor search space or an anchor search space set. The anchor search space may be located in a primary cell (PCell) or a primary secondary cell (PSCell). The anchor search space may be located in a PCell or PSCell because the quality of a control resource set (coreset) in the PCell or PSCell may be tracked and maintained for radio link monitoring or beam-failure detection. The UEs (e.g., UE 210) serviced by the base station 205 may monitor the anchor search set for a PDCCH or a common PDCCH. Other search spaces may be dynamically activated or deactivated based on the information included in the PDCCH received during the anchor search space. The activating/deactivating of search spaces by the UE 210 may be an example of a UE transitioning between active states and sleep states. In some cases, dynamically activating/deactivating search spaces may be limited to being within a same component carrier or a same bandwidth part. In some cases, dynamically activating/deactivating search spaces may be limited to being within other active component carriers or bandwidth parts.

Figure 3:
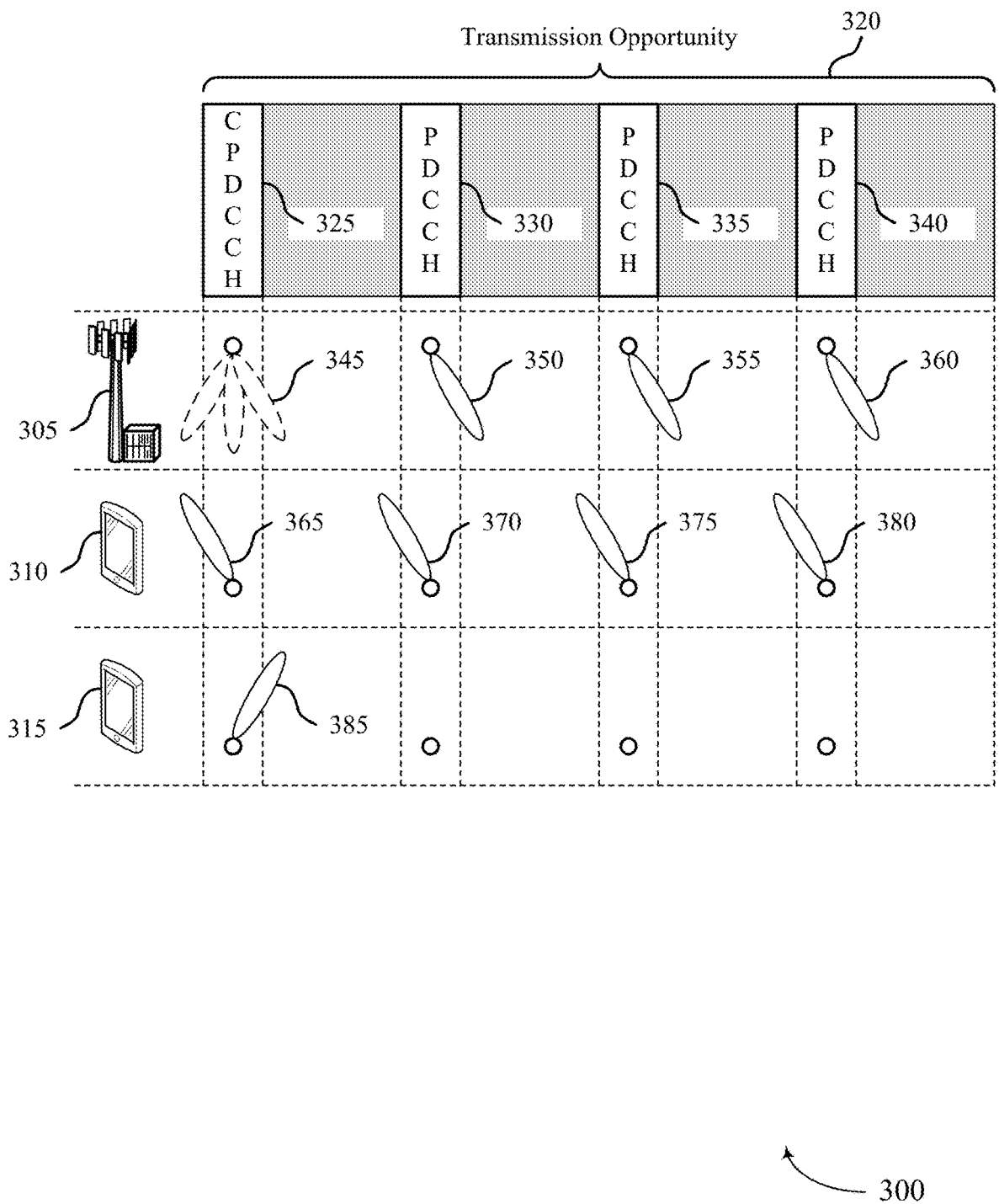
FIG. 3 illustrates an example of a timing diagram that supports techniques for search space management in accordance with aspects of the present disclosure.

FIG. 3 illustrates an example of a timing diagram 300 that supports techniques for search space management in accordance with various aspects of the present disclosure. In some examples, the timing diagram 300 may implement aspects of wireless communications systems 100 and 200.

The timing diagram 300 illustrates directional communications between a base station 305, a first UE 310, and a second UE 315 during a transmission opportunity 320. The transmission opportunity 320 may include a plurality of resource sets, including a common PDCCH 325 and a plurality of UE-specific PDCCHs 330, 335, 340. The common PDCCH 325 may be part of a coreset or may include a coreset that is configured to include control information for a plurality of the UEs serviced by the base station 305. Each UE (e.g., the first UE 310 and the second UE 315) serviced by the base station 305 may monitor search spaces for common PDCCHs 325. The UE-specific PDCCHs 330, 335, 340 may be configured to include control information for a subset of UEs serviced by the base station 305. For example, the UE-specific PDCCHs 330, 335, 340 may include control information for one or more UEs (e.g., the first UE 310). The base station 305 may be an example of the base stations 105, 205 described with reference to FIGS. 1 and 2. The UEs 310, 315 may be examples of the UEs 115, 210 described with reference to FIGS. 1 and 2.

The timing diagram 300 may also illustrate transmission beams 345, 350, 355, 360 that may be used by the base station 305 during the transmission opportunity 320. The timing diagram 300 may also illustrate directional listening 365, 370, 375, 380 used by the first UE 310 during the transmission opportunity 320 and/or directional listening 385 used by the second UE 315 during the transmission opportunity 320.

The common PDCCH 325 may be configured to include an indication of the transmission beams to be used by the base station 305 during the transmission opportunity 320. The indication of the transmission beams may be done using one or more different techniques. In some cases, the common PDCCH 325 may indicate a group of UEs that are configured to use a set of transmission beams. In some cases, the common PDCCH 325 may include a transmission configuration indicator (TCI) that indicates the transmission beams to be used by the base station 305 during the transmission opportunity 320, or indicates a group of UEs that are configured to use a set of transmission beams, or other information, or any combination thereof. In any of these cases, the UEs 310, 315 may use the information in the common PDCCH 325 to determine whether the UE can enter a sleep state during the transmission opportunity 320 or whether the UE should be in an active state for at least a portion of the transmission opportunity 320. In some cases, a common PDCCH 325 may include an indication of a start of a transmission opportunity. In some cases, a sleep state of the UE may be referred to as a low power state of the UE.

The first UE 310 is illustrated as an example of a UE that is in an active state for at least a portion of the transmission opportunity 320. The first UE 310 may monitor a search space for the common PDCCH 325. The first UE 310 may determine whether the base station 305 is going to use a transmission beam associated with the first UE 310. Upon determining that the base station 305 is going to use transmission beams associated with the first UE 310, the first UE 310 may adjust to be in an active state for at least a portion of the transmission opportunity 320.

In some cases, the first UE 310 may enter an active state for the remainder of the transmission opportunity 320 based on the indication in the common PDCCH 325. In some cases, the first UE 310 may enter an active state to monitor search spaces for one or more UE-specific PDCCHs 330, 335, 340 associated with the transmission opportunity 320 based on the indication in the common PDCCH 325. For example, the first UE 310 may be active for each UE-specific PDCCH 330, 335, 340 in the transmission opportunity 320. In other examples, the first UE 310 may monitor only a portion (e.g., a subset) of the UE-specific PDCCHs in the transmission opportunity. In such examples, the common PDCCH 325 may include an indication of which UE-specific PDCCHs the first UE 310 is intended to monitor. The first UE 310 may enter an active state to receive information or data from the base station 305 based on receiving the common PDCCH 325 and/or receiving one or more UE-specific PDCCHs 330, 335, 340.

The second UE 315 is illustrated as an example of a UE that enters a sleep state for the transmission opportunity 320 after receiving the common PDCCH 325. The second UE 315 may monitor a search space for the common PDCCH 325. The second UE 315 may determine whether the base station 305 is going to use a transmission beam associated with the second UE 315. Upon determining that the base station 305 is not going to use transmission beams associated with the second UE 315, the second UE 315 may enter a sleep state for the remainder of the transmission opportunity 320.

In some cases, the common PDCCH 325 may also include an indication of the transmission beams that will be unused during the transmission opportunity 320. In such cases, the second UE 315 may determine that the transmission beams associated with the second UE 315 are to be unused during the transmission opportunity 320. The second UE 315 may enter a sleep state for the remainder of the transmission opportunity 320 based on this determination.

In some cases, the base station 305 may transmit the common PDCCH 325 using a plurality of transmission beams 345, which may in some cases be transmitted in a beam sweep pattern. UEs serviced by the base station 305 may not be reachable using a single directional transmission beam. Further, UEs may move throughout a coverage area thereby potentially causing misalignment in beam pair links. To address these issues, the base station 305 may transmit the common PDCCH 325 in a plurality of transmission beams 345 using a beam sweeping pattern where the plurality of transmission beams 345 are transmitted at different angles at different times or concurrently. The UEs may receive one or more of the beam-swept common PDCCHs 325.

In some cases, the base station 305 and the UEs 310, 315 may be configured to communicate the common PDCCH 325 on a first cell (e.g., a primary cell) different than a secondary cell used to communicate other PDCCHs during the transmission opportunity 320 and information or data during the transmission opportunity 320. For example, the common PDCCH 325 may be transmitted using a cell that is in the sub-6 gigahertz radio frequency spectrum band and the other portions of the transmission opportunity may be transmitted in a radio frequency spectrum band that is a millimeter wave radio frequency spectrum band. In some cases, the indication of the directional transmission beams may be received using a radio frequency band that does not use directional beams. In some cases, the indication of the directional transmission beams may be received using a radio access technology different than the radio access technology used to communicate the information. For example, the information may be communicated using directional beams in NR and the common PDCCH may be communicated using LTE, 3G, NR using the sub-6 GHz range, CDMA, Wi-Fi, or other radio access technology. Such cases may be used as part of carrier aggregation.

Figure 4:
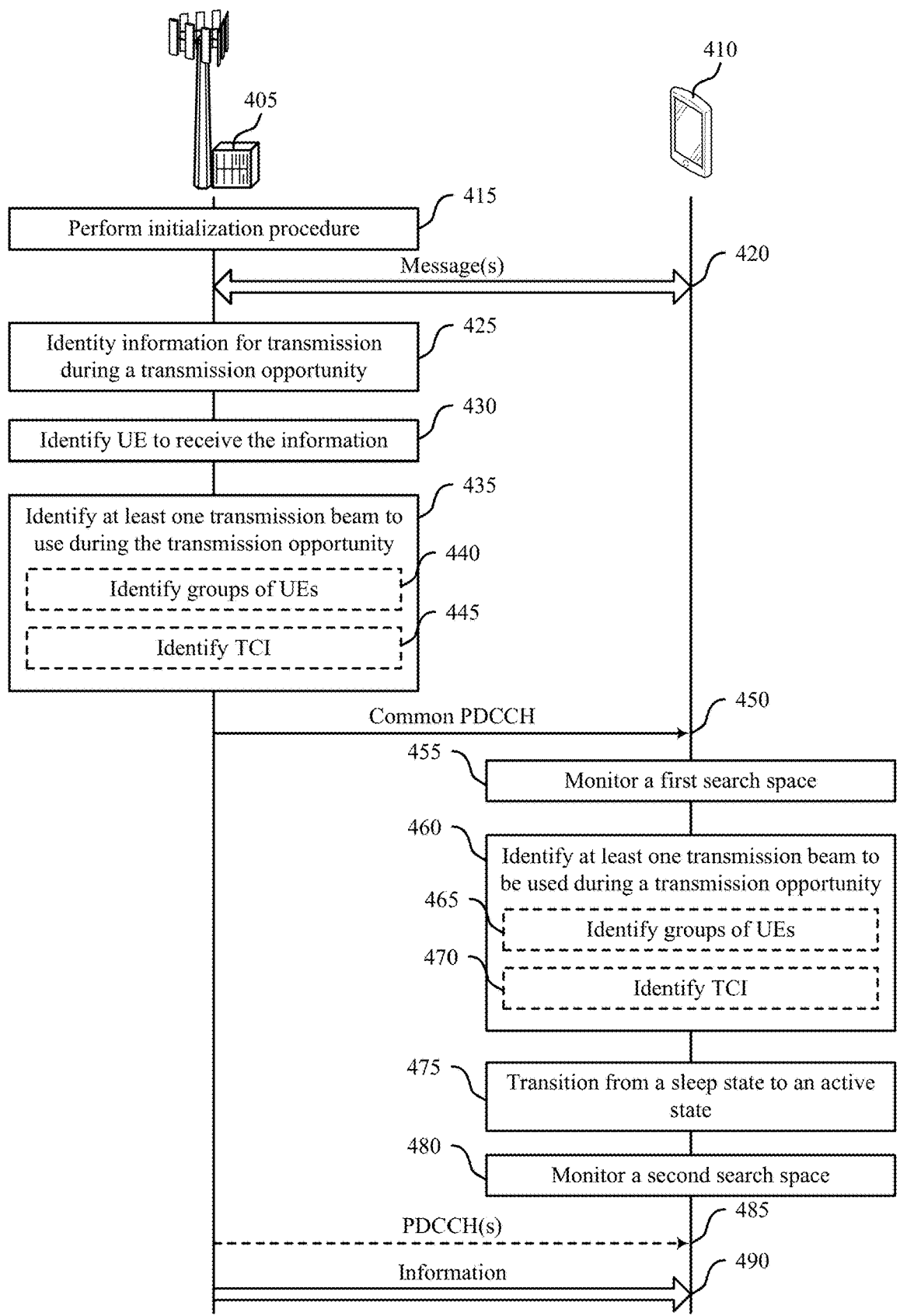
FIG. 4 illustrates an example of a flow diagram that supports techniques for search space management in accordance with aspects of the present disclosure.

FIG. 4 illustrates an example of a flow diagram 400 that supports techniques for search space management in accordance with various aspects of the present disclosure. In some examples, the flow diagram 400 may implement aspects of wireless communications systems 100 and 200. The flow diagram 400 illustrates communications and/or functions of a base station 405 and UE 410. The base station 405 may be an example of the base stations 105, 205, 305 described with reference to FIGS. 1-3. The UE 410 may be an example of the UEs 115, 210, 310, 315 described with reference to FIGS. 1-3.

The flow diagram 400 illustrates methods for using a common PDCCH to indicate, by the base station 405, transmission beams to be used during a transmission opportunity to the UE 410. The base station 405 may also indicate periodicities to the UE 410 for monitoring search spaces during a transmission opportunity.

At block 415, the base station 405 may perform an initialization procedure. The initialization procedure may be configured to associate the UE 410 with one or more transmission beams to use in future communications between the base station 405 and the UE 410. The base station 405 and the UE 410 may exchange one or more messages 420 as part of the initialization procedure. For example, the base station 405 and the UE 410 may exchange one or more requests for information (e.g., about capabilities) and one or more responses to requests.

At block 425, the base station 405 may identify information for transmission during a transmission opportunity. For example, the base station 405 may identify that a buffered data is waiting to be transmitted to the UE 410. In some cases, the base station 405 may contend for access to a shared radio frequency spectrum band to obtain a transmission opportunity to communicate the identified information.

At block 430, the base station 405 may identify a UE (e.g., UE 410) to receive the identified information. Determining the UE to receive the information may be used by the base station 405 to determine the transmission beams to use during the transmission opportunity.

At block 435, the base station 405 may identify at least one transmission beam to use during the transmission opportunity. In some cases, identifying the at least one transmission beam may be based on one or more UEs scheduled to receive information during the transmission opportunity.

Once the at least one transmission beam is identified, the base station 405 may generate an indication to include in a common PDCCH 450. The indication may be used to inform the UE 410 about the transmission beams that will be used during the transmission opportunity to communicate information with the UE 410. The indication in the common PDCCH 450 may identify indexes of the transmission beams to be used during the transmission opportunity, the indication may identify indexes of transmission beams that will not be used during the transmission opportunity, the indication may identify both indexes of transmission beams to be used and transmission beams to remain unused during the transmission opportunity, the indication may identify a group of UEs scheduled to receive information during the transmission opportunity, or the indication may identify an TCI associated with the transmission beams to be used during the transmission opportunity, or a combination.

At block 440, the base station 405 may identify one or more groups of UEs that include at least one UE scheduled to receive information during the transmission opportunity. Each group of UEs may be associated with one or more transmission beams. By identifying the groups of UEs, the base station 405 may be identifying the transmission beams to be used during the transmission opportunity.

In some cases, the base station 405 may group UEs into one or more groups based on a variety of factors and then assign transmission beams to at least some if not each group. For example, the base station 405 may group UEs based on location within a coverage area or other factors. In some examples, the base station 405 may group the UEs as part of the initialization procedure. Once the UEs are grouped and assigned transmission beams, the base station 405 may use these groups to communicate which transmission beams will be used during a transmission opportunity. In such examples, the base station 405 may include in the common PDCCH 450 an identifier for one or more groups of UEs that include at least one UE scheduled to receive information during the transmission opportunity. The UEs (e.g., UE 410)

may use that identifier of the group to determine whether the UEs should be in an active state for at least a portion of the transmission opportunity.

At block 445, the base station 405 may identify a TCI associated with at least one UE scheduled to receive information during the transmission opportunity. The TCI may be included in the common PDCCH 450 and the TCI may be configured to indicate the transmission beams to be used during transmission opportunity. The common PDCCH 450 may be configured to include one or more TCIs. The base station 405 may transmit the common PDCCH 450 that includes the TCIs that the base station 405 intends to use during the transmission opportunity. The UEs that are not associated with the intended TCIs may enter a sleep state for the duration of the transmission opportunity.

In some cases, a TCI may be associated with one or more transmission beams or one or more groups of transmission beams. In some cases, a TCI may be mapped to the one or more transmission beams or the one or more groups of transmission beams and the UE 410 may know the mapping (e.g., based on a preconfigured mapping, based on a reference of mapping, based on a look up table having the mapping, or a combination thereof). In some cases, the base station may broadcast the mapping information to the UEs using some control information. In such cases, the UE 410 may be configured to identify the transmission beams used in the transmission opportunity based on the one or more TCIs included in the common PDCCH 450. In some cases, each TCI is mapped to one transmission beam or one group of transmission beams.

In some cases, a TCI may be associated with one or more UEs or groups of UEs. In some cases, a TCI may be mapped to the one or more UEs or the groups of UEs and the UE 410 may know the mapping. In such cases, the UE 410 may be configured to identify the transmission beams used in the transmission opportunity based on the one or more TCIs included in the common PDCCH 450. In some cases, each TCI is mapped to one UE or one group of UEs.

At block 455, the UE 410 may monitor a first search space for the common PDCCH 450. The UE 410 may receive the common PDCCH 450 based on monitoring the first search space.

At block 460, the UE 410 may identify at least one transmission beam to be used during the transmission opportunity based on receiving the common PDCCH 450. The UE 410 may identify the transmission beams using a variety of different methods.

In some cases, the common PDCCH 450 may include a field that indicates the transmission beams directly. In such cases, the common PDCCH 450 may include indexes of transmission beams or indexes of groups of transmission beams to be used during the transmission opportunity. The UE 410 may identify the transmission beams by identifying the indexes.

In some cases, at block 465, the common PDCCH 450 may include a field that indicates one or more groups of UEs that include at least one UE scheduled to receive information during the transmission opportunity. In such cases, the common PDCCH 450 may include indexes of the groups of UEs configured to receive information during the transmission opportunity. The UE 410 may identify the groups of UEs identified by the indexes in the common PDCCH 450 and may identify the transmission beams based on the identified groups. In some cases, the UE 410 may identify the transmission beams based on a mapping of the groups of UEs to transmission beams.

In some cases, at block 470, the common PDCCH 450 includes a field that indicates one or more TCIs to be used during the transmission opportunity. The UE 410 may identify the TCIs in the common PDCCH 450 and may identify the transmission beams based on the TCIs. In some cases, the UE 410 may identify the transmission beams based on a mapping of the TCIs to transmission beams.

In some cases, the TCIs may be associated with one or more groups of UEs that include at least one UE scheduled to receive information during the transmission opportunity. For example, a single TCI may be mapped to a single group of UEs in a one-to-one mapping. In other examples, a single TCI may be mapped to multiple groups of UEs in a one-to-many mapping. In yet other examples, multiple TCIs may be mapped to a single group of UEs in a many-to-one mapping. In yet further examples, multiple TCIs may be mapped to multiple groups of UEs in a many-to-many mapping. Each group of UEs may be associated with a set of transmission beams in a one-to-one mapping between groups and transmission beams. The UE 410 may identify the groups of UEs based on the TCIs included in the common PDCCH 450. The UE 410 may then identify the transmission beams based on the groups of UEs indicated by the TCIs. In some cases, the UE 410 may identify the transmission beams based on a mapping of the groups of UEs to transmission beams.

At block 475, the UE 410 may transition from a sleep state to an active state at least once during the transmission opportunity based on identifying one or more transmission beams associated with the UE 410. For example, the UE 410 may transition to an active state for the remainder of the transmission opportunity based on identifying transmission beams associated with the UE 410 and indicated in the common PDCCH 450. In another example, the UE 410 may transition to an active state at a time during the transmission opportunity indicated in the common PDCCH 450 based on identifying transmission beams associated with the UE 410 and indicated in the common PDCCH 450.

At block 480, the UE 410 may monitor a second search space during the transmission opportunity based on identifying transmission beams associated with the UE 410 and indicated in the common PDCCH 450. The UE 410 may monitor search spaces for one or more UE-specific PDCCHs 485 included in the transmission opportunity. This function may be another example of the UE 410 transitioning to an active state based on identifying transmission beams associated with the UE 410 and indicated in the common PDCCH 450.

The UE 410 may be configured to receive information 490 based on monitoring for the common PDCCH 450 and/or monitoring for the other PDCCHs 485. In some cases, the UE 410 may be configured to receive information based on receiving the common PDCCH 450 and independent of other information (e.g., other PDCCHs 485). In some cases, the UE 410 may be configured to receive information based on receiving a UE-specific PDCCH 485. In some cases, the UE 410 may be configured to receive information based on receiving both a common PDCCH 450 and at least one UE-specific PDCCH 485. Information may comprise data transmitted as part of a physical downlink shared channel (PDSCH), or control information transmitted as part of a different PDCCH, information received using other channels, or a combination thereof.

Figure 5:
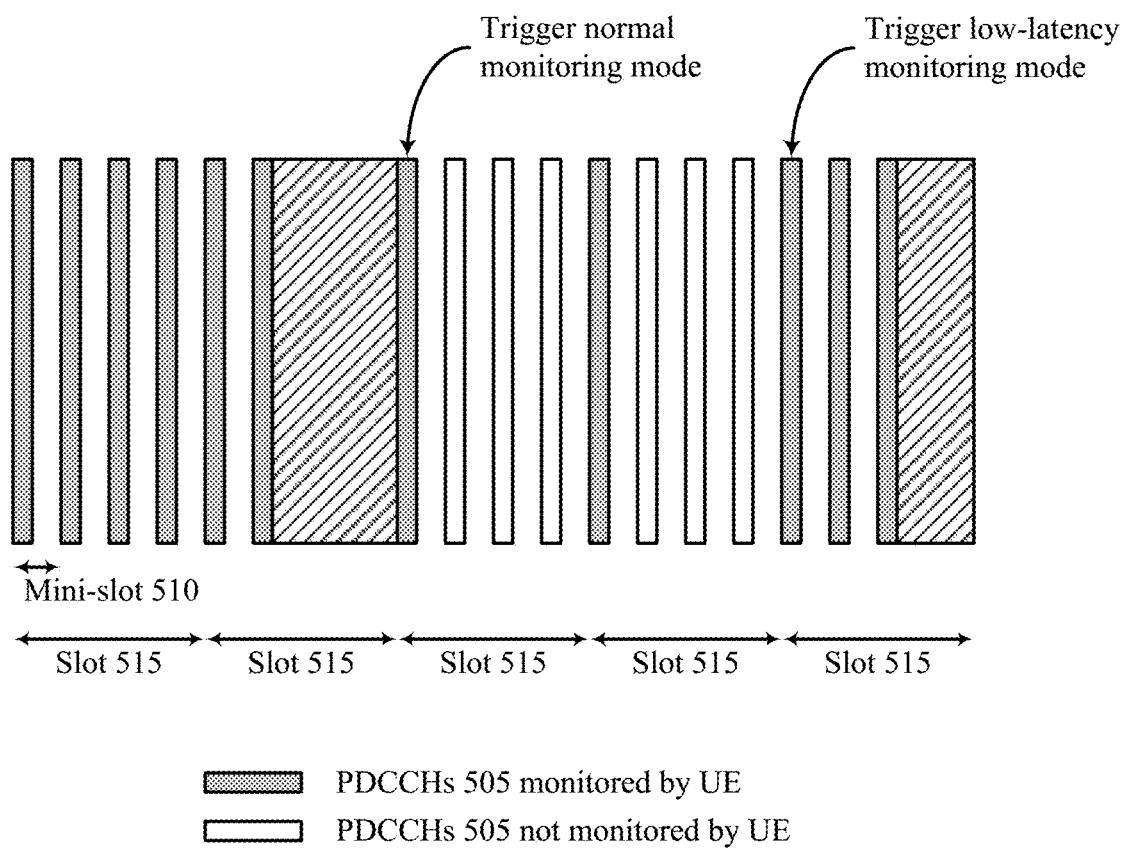
FIG. 5 illustrates an example of a timing diagram that supports techniques for search space management in accordance with aspects of the present disclosure.

FIG. 5 illustrates an example of a timing diagram 500 that supports techniques for search space management in accordance with various aspects of the present disclosure. In some examples, the timing diagram 500 may implement aspects of wireless communications systems 100 and 200.

The timing diagram 500 illustrates methods and signaling a UE may use to adjust how frequently the UE monitors search spaces for PDCCHs 505. The timing diagram 500 may illustrate communications and/or functions of a base station and a UE. The base stations described with reference to the timing diagram 500 may be examples of the base stations 105, 205, 305, 405 described with reference to FIGS. 1-4. The UEs described with reference to the timing diagram 500 may be an example of the UEs 115, 210, 310, 315, 410 described with reference to FIGS. 1-4.

In some wireless communications systems, a UE may monitor an anchor search space for a common PDCCH 505 that may include an anchor coreset for an indication of a start of a transmission opportunity. Such a configuration may allow a UE to reduce blind decoding when searching for the start of a transmission opportunity, especially in some shared radio frequency band spectrums.

Once the UE detects a common PDCCH 505, the UE may switch to another coreset with less-frequent monitoring to reduce PDCCH 505 monitoring overhead. For example, the UE may monitor for PDCCHs 505 with a first periodicity (e.g., once every mini-slot 510), but the UE may switch to monitoring for PDCCHs 505 with a second periodicity (e.g., once every slot 515). In some cases, the common PDCCH may indicate one or more periodicities for monitoring for future PDCCHs 505. For example, the common PDCCH may include a field that indicates the periodicity that the UE is to use for monitoring for PDCCHs 505. In some cases, the UE may select a second periodicity for monitoring for PDCCHs, which may be different from an initial or first periodicity and which may be based on the UE not receiving a PDCCH for a duration that satisfies a threshold in some cases.

Examples of this may include the UE operating in a normal mode for monitoring PDCCHs 505 with a first periodicity. In the normal mode, the UE may monitor for PDCCHs 505 once every slot 515. In a low-latency mode, the UE may monitor for PDCCHs 505 once every mini-slot 510.

Figure 6:
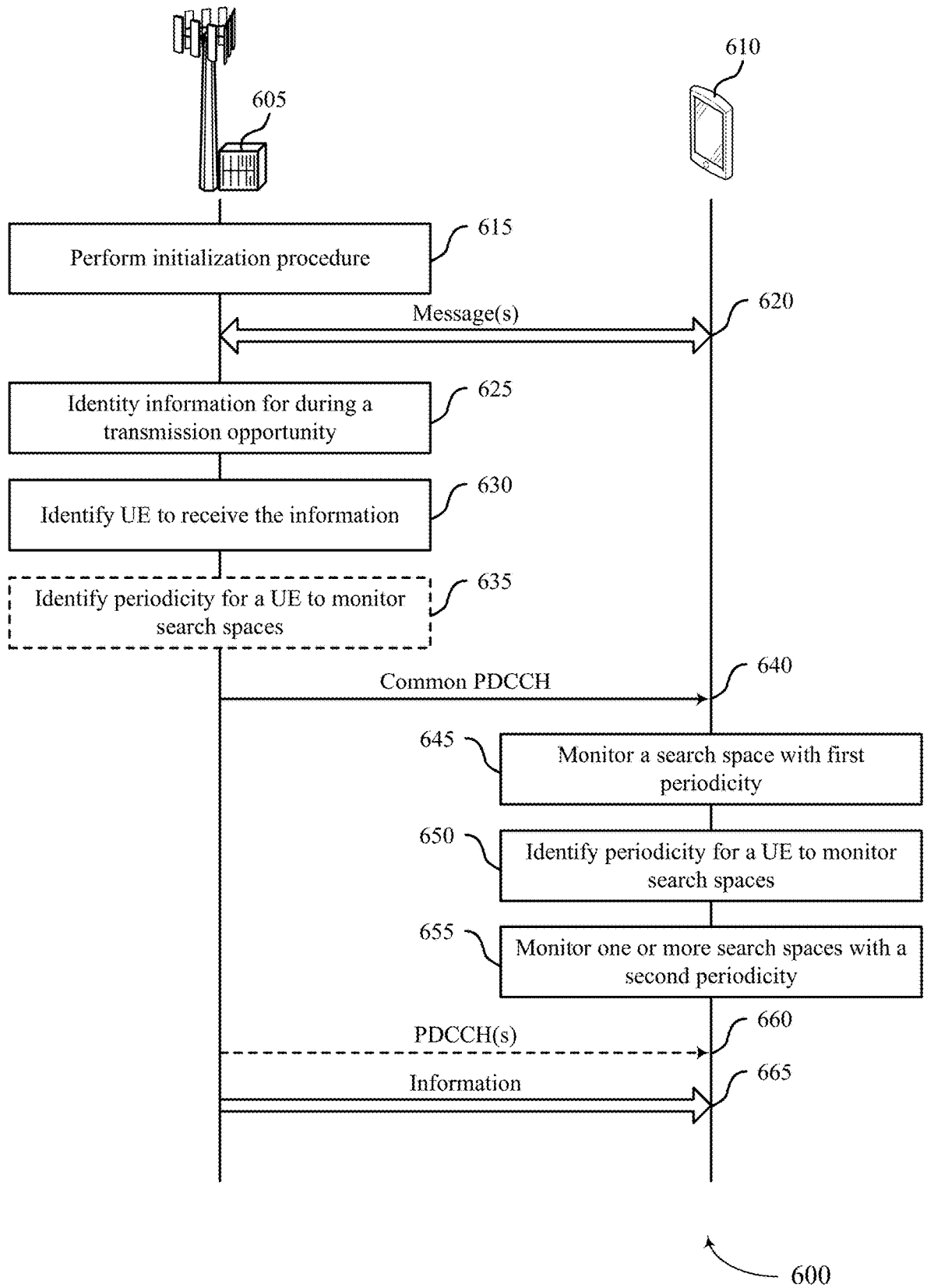
FIG. 6 illustrates an example of a flow diagram that supports techniques for search space management in accordance with aspects of the present disclosure.

FIG. 6 illustrates an example of a flow diagram 600 that supports techniques for search space management in accordance with various aspects of the present disclosure. In some examples, the flow diagram 600 may implement aspects of wireless communications systems 100 and 200. The flow diagram 600 illustrates communications and/or functions of a base station 605 and UE 610. The base station 605 may be an example of the base stations 105, 205, 305, 405 described with reference to FIGS. 1-5. The UE 610 may be an example of the UEs 115, 210, 310, 315, 415 described with reference to FIGS. 1-5.

The flow diagram 600 illustrates methods for changing how frequently a UE 610 monitors for PDCCHs. In some cases, the base station 605 may indicate periodicities to the UE 610 for monitoring search spaces during a transmission opportunity using the common PDCCH 640. In some cases, the UE 610 may determine periodicities for monitoring search spaces based on a duration since the UE 610 last received information (e.g., a PDCCH satisfying a threshold).

At block 615, the base station 605 may perform an initialization procedure. The initialization procedure may be configured to set a periodicity for the UE 610 to monitor search spaces for PDCCHs. In some cases, the initialization procedure may be used to associate the UE 610 with one or more transmission beams to use in future communications between the base station 605 and the UE 610. The base station 605 and the UE 610 may exchange one or more messages 620 as part of the initialization procedure. For example, the base station 605 and the UE 610 may exchange one or more requests for information (e.g., about capabilities) and one or more responses to requests.

At block 625, the base station 605 may identify information for transmission during a transmission opportunity. For example, the base station 605 may identify that information (e.g., buffered data) is waiting to be transmitted to the UE 610. In some cases, the base station 605 may contend for access to a shared radio frequency spectrum band to obtain a transmission opportunity to communicate the identified information.

At block 630, the base station 605 may identify a UE (e.g., UE 610) to receive the identified information. Determining the UE to receive the information may be used by the base station 605 to determine the transmission beams to use during the transmission opportunity.

At block 635, the base station 605 may optionally identify a periodicity for a UE to monitor search spaces for PDCCHs. The base station 605, in some cases, may include an indication of the periodicity in the common PDCCH. In some cases, the indication may identify the periodicity to be used by the UE 610 to monitor for PDCCHs. In some cases, the indication may be a trigger for a UE 610 to enter a given mode (e.g., normal mode or low-latency mode). Once the UE 610 enters the given mode, the UE 610 may use a periodicity for monitoring for PDCCHs that is associated with that mode.

At block 645, the UE 610 may monitor a first search space for the common PDCCH 640 using a first periodicity. The first periodicity may be determined by the base station 605 and communicated using a PDCCH (e.g., a common PDCCH), may be determined by the UE 610, or may be associated with a mode of operation of the UE 610, or may be a combination thereof. The UE 610 may receive the common PDCCH 640 based on monitoring the first search space, in some cases.

At block 650, the UE 610 may identify a periodicity for the UE 610 to monitor search spaces for PDCCHs. In some cases, the UE 610 may identify an indicator included in the common PDCCH 640 that specifies the periodicity the UE 610 is to use. In some cases, the common PDCCH 640 may include in indicator that includes a mode of operation for the UE 610, where the periodicity is associated with the mode of operation. In some cases, the UE 610 may determine whether a duration since last receiving a PDCCH (or common PDCCH 640) satisfies a threshold. The UE 610 may determine a new periodicity or a new mode of operation based on the duration satisfying the threshold.

At block 655, the UE 610 may monitor one or more search spaces using the second periodicity different than the first periodicity. The UE 610 may adjust the periodicity based on one of the triggers described herein. The UE 610 may monitor search spaces for one or more PDCCHs 660 (whether common or UE-specific). This function may be another example of the UE 610 transitioning to an active state.

The UE 610 may be configured to receive information 665 based on monitoring for the common PDCCH 640 and/or monitoring for the other PDCCHs 660. In some cases, the UE 610 may be configured receive information based on receiving only the common PDCCH 640. In some cases, the UE 610 may be configured to receive information based on receiving a UE-specific PDCCH 660. In some cases, the UE 610 may be configured to receive information based on receiving both a common PDCCH 640 and at least one UE-specific PDCCH 660. Information may comprise data transmitted as part of a PDSCH, or control information transmitted as part of a different PDCCH, information received using other channels, or a combination thereof.

The methods and functions described with reference to the flow diagram 600 may be combined with the method and function described with reference to the flow diagram 400 described with reference to FIG. 4. As the methods, functions, steps, procedures, and/or operations of the flow diagram 400 and the flow diagram 600 are combined, the methods, functions, steps, procedures, and/or operations may be rearranged or otherwise modified.

Figure 7:
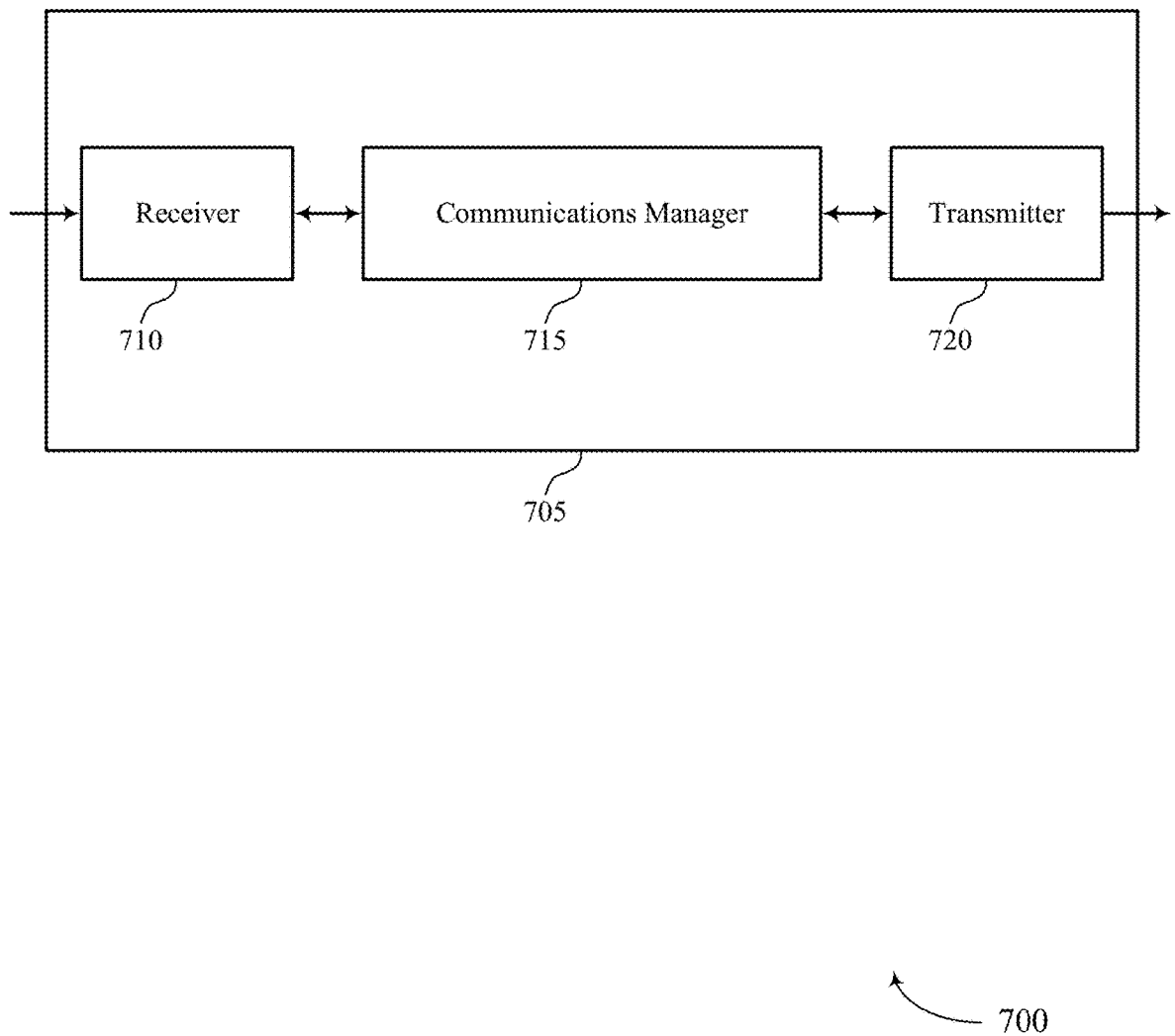
FIGS. 7 and 8 show block diagrams of devices that support techniques for search space management in accordance with aspects of the present disclosure.

FIG. 7 shows a block diagram 700 of a device 705 that supports techniques for search space management in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for search space management, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may monitor a search space for a common physical downlink control channel associated with a transmission opportunity, identify at least one transmission beam for use by a base station during the transmission opportunity based on the common physical downlink control channel, and receive information using the at least one transmission beam during the transmission opportunity. The communications manager 715 may also monitor, using a first periodicity, a search space for a common physical downlink control channel associated with a transmission opportunity, monitor, using the second periodicity, the search space for a second common physical downlink control channel based on identifying the second periodicity, detect the common physical downlink control channel based on monitoring the search space using the first periodicity, and identify a second periodicity for monitoring the search space based on information included in the common physical downlink control channel. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
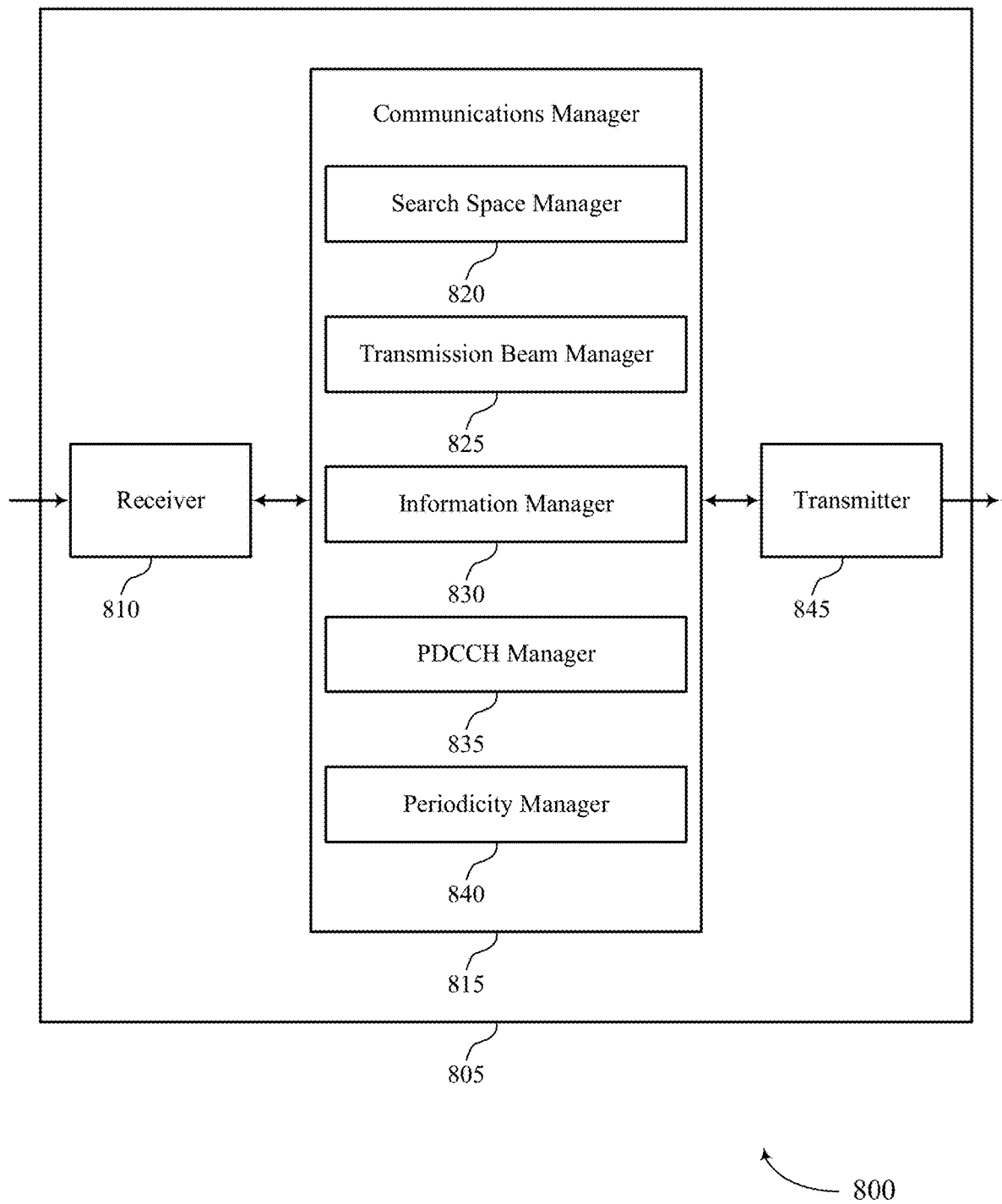

FIG. 8 shows a block diagram 800 of a device 805 that supports techniques for search space management in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to techniques for search space management, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a search space manager 820, a transmission beam manager 825, an information manager 830, a PDCCH manager 835, and a periodicity manager 840. The communications manager 815 may be an example of aspects of the communications manager 1010 described herein.

The search space manager 820 may monitor a search space for a common physical downlink control channel associated with a transmission opportunity.

The transmission beam manager 825 may identify at least one transmission beam for use by a base station during the transmission opportunity based on the common physical downlink control channel.

The information manager 830 may receive information using the at least one transmission beam during the transmission opportunity.

The search space manager 820 may monitor, using a first periodicity, a search space for a common physical downlink control channel associated with a transmission opportunity and monitor, using the second periodicity, the search space for a second common physical downlink control channel based on identifying the second periodicity.

The PDCCH manager 835 may detect the common physical downlink control channel based on monitoring the search space using the first periodicity.

The periodicity manager 840 may identify a second periodicity for monitoring the search space based on information included in the common physical downlink control channel.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
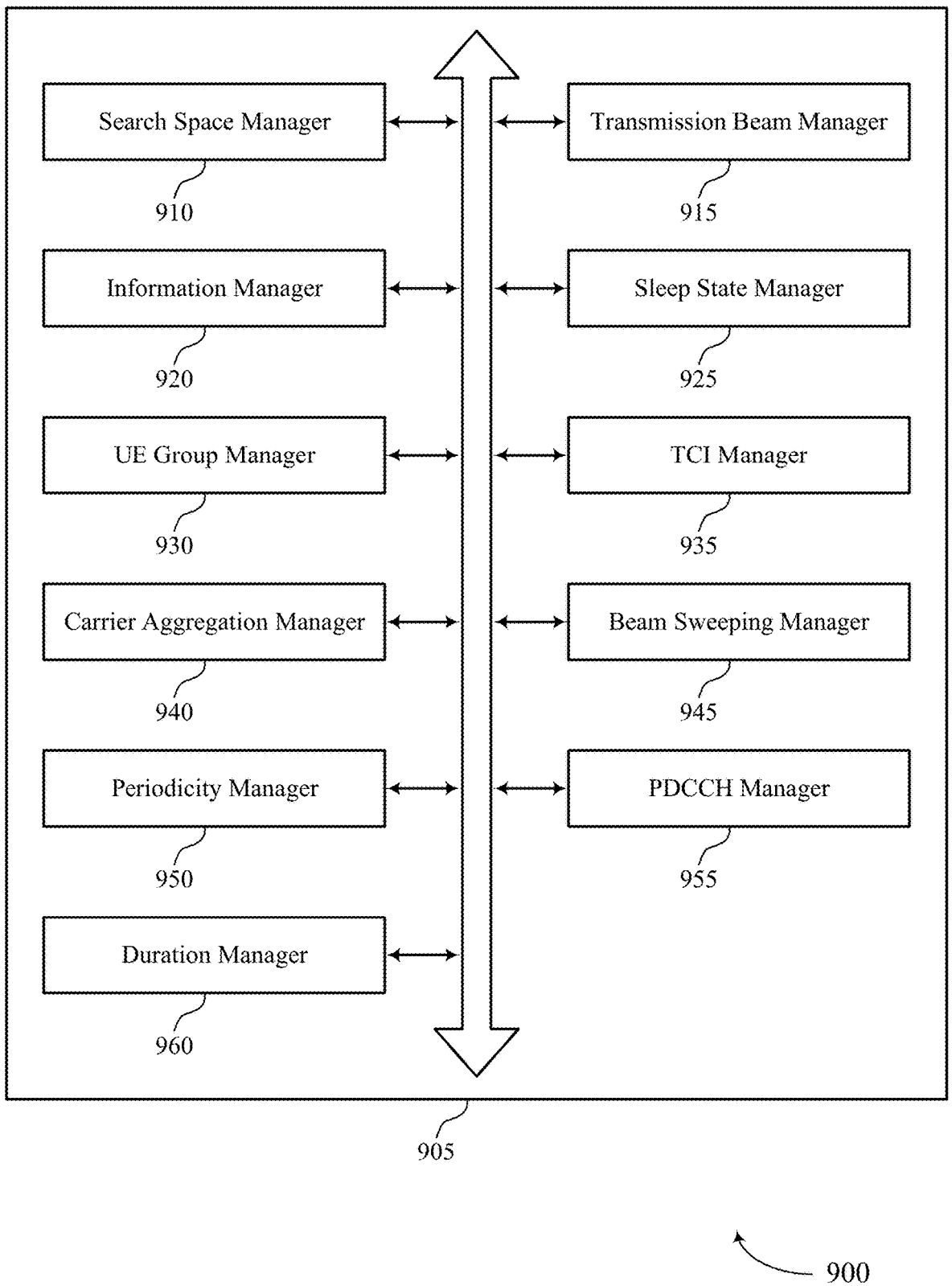
FIG. 9 shows a block diagram of a communications manager that supports techniques for search space management in accordance with aspects of the present disclosure.

FIG. 9 shows a block diagram 900 of a communications manager 905 that supports techniques for search space management in accordance with aspects of the present disclosure. The communications manager 905 may be an example of aspects of a communications manager 715, a communications manager 815, or a communications manager 1010 described herein. The communications manager 905 may include a search space manager 910, a transmission beam manager 915, an information manager 920, a sleep state manager 925, a UE group manager 930, a TCI manager 935, a carrier aggregation manager 940, a beam sweeping manager 945, a periodicity manager 950, a PDCCH manager 955, and a duration manager 960. Each of these modules may communicate, directly or indirectly, with one another (e.g., via one or more buses).

The search space manager 910 may monitor a search space for a common physical downlink control channel associated with a transmission opportunity. In some examples, the search space manager 910 may monitor, using a first periodicity, a search space for a common physical downlink control channel associated with a transmission opportunity.

In some examples, the search space manager 910 may monitor, using the second periodicity, the search space for a second common physical downlink control channel based on identifying the second periodicity. In some examples, the search space manager 910 may monitor a second search space associated with the transmission opportunity based on identifying the at least one transmission beam, where receiving the information using the at least one transmission beam during the transmission opportunity is based on monitoring the second search space. In some examples, the search space manager 910 may dynamically activate at least a portion of the UE based on the common physical downlink control channel. In some cases, the UE may monitor downlink channels during one or more indicated time intervals, monitor one or more PDCCHs, change states (e.g., wake-up), or any combination therefore.

In some examples, the search space manager 910 may receive the common physical downlink control channel based on monitoring the search space, where identifying the at least one transmission beam is based on receiving the common physical downlink control channel. In some examples, the search space manager 910 may monitor a second search space for a second common physical downlink control channel associated with a second transmission opportunity. In some cases, the search space includes at least a portion of a control resource set.

The transmission beam manager 915 may identify at least one transmission beam for use by a base station during the transmission opportunity based on the common physical downlink control channel. In some examples, the transmission beam manager 915 may determine that the at least one transmission beam is to be used to communicate information with the UE during the transmission opportunity, where transitioning from the sleep state to the active state is based on determining that the at least one transmission beam is to be used to communicate information with the UE during the transmission opportunity.

In some examples, the transmission beam manager 915 may identify a second transmission beam that will not be used by the base station during the transmission opportunity based on the common physical downlink control channel. In some examples, the transmission beam manager 915 may determine that the second transmission beam is associated with the UE. In some examples, the transmission beam manager 915 may identify a second transmission beam that will not be used by the base station during the second transmission opportunity based on the second common physical downlink control channel. In some cases, the common physical downlink control channel indicates a set of transmission beams for use during the transmission opportunity, the set of transmission beams including the at least one transmission beam.

The information manager 920 may receive information using the at least one transmission beam during the transmission opportunity. In some cases, the transmission opportunity is in the shared radio frequency spectrum.

The sleep state manager 925 may transition from a sleep state to an active state based on identifying the at least one transmission beam, where receiving the information is based on transitioning from the sleep state to the active state. In some examples, the sleep state manager 925 may enter, by the UE, a sleep state to conserve power, where monitoring the search space is based on entering the sleep state.

In some examples, the sleep state manager 925 may transition from an active state to a sleep state based on identifying the second transmission beam that will not be used by the base station during the transmission opportunity and determining that the second transmission beam is associated with the UE. In some examples, the sleep state manager 925 may transition from an active state to a sleep state based on identifying the second transmission beam.

The UE group manager 930 may identify an identifier of a group of UEs scheduled to receive information during the transmission opportunity included in the common physical downlink control channel, where transitioning from the sleep state to the active state is based on identifying the group of UEs scheduled to receive information during the transmission opportunity.

The TCI manager 935 may identify a TCI based on the common physical downlink control channel, where transitioning from the sleep state to the active state is based on identifying the TCI. In some examples, the TCI manager 935 may identify a group of UEs scheduled to receive information during the transmission opportunity based on the TCI included in the common physical downlink control channel, where identifying the at least one transmission beam is based on identifying the group of UEs scheduled to receive information during the transmission opportunity. In some examples, the TCI manager 935 may there is a one-to-one mapping between TCIs and groups of UEs.

The carrier aggregation manager 940 may monitor the search space on a primary cell, the method further including. In some cases, the primary cell is a sub-6 gigahertz cell and the secondary cell is a mmW cell.

The beam sweeping manager 945 may receive a set of beams that include the common physical downlink control channel based on monitoring the search space, where identifying the at least one transmission beam is based on receiving at least one of the set of beams that includes the common physical downlink control channel.

The periodicity manager 950 may identify a second periodicity for monitoring the search space based on information included in the common physical downlink control channel. In some examples, the periodicity manager 950 may identify a periodicity for monitoring the search space different than a current periodicity for monitoring the search space based on the common physical downlink control channel.

In some examples, the periodicity manager 950 may monitor a second search space based on identifying the periodicity. In some examples, the periodicity manager 950 may determine that at least a portion of the transmission opportunity includes information for the UE, where identifying the second periodicity is based on identifying that the portion of the transmission opportunity includes information for the UE.

In some examples, the periodicity manager 950 may detect that the common physical downlink control channel indicates the second periodicity. In some cases, the first periodicity includes monitoring the search space once per mini-slot. In some cases, the second periodicity includes monitoring the search space once per slot.

The PDCCH manager 955 may detect the common physical downlink control channel based on monitoring the search space using the first periodicity.

The duration manager 960 may determine that a duration since the common physical downlink control channel is detected satisfies a threshold, where identifying the second periodicity is based on the duration satisfying the threshold.

Figure 10:
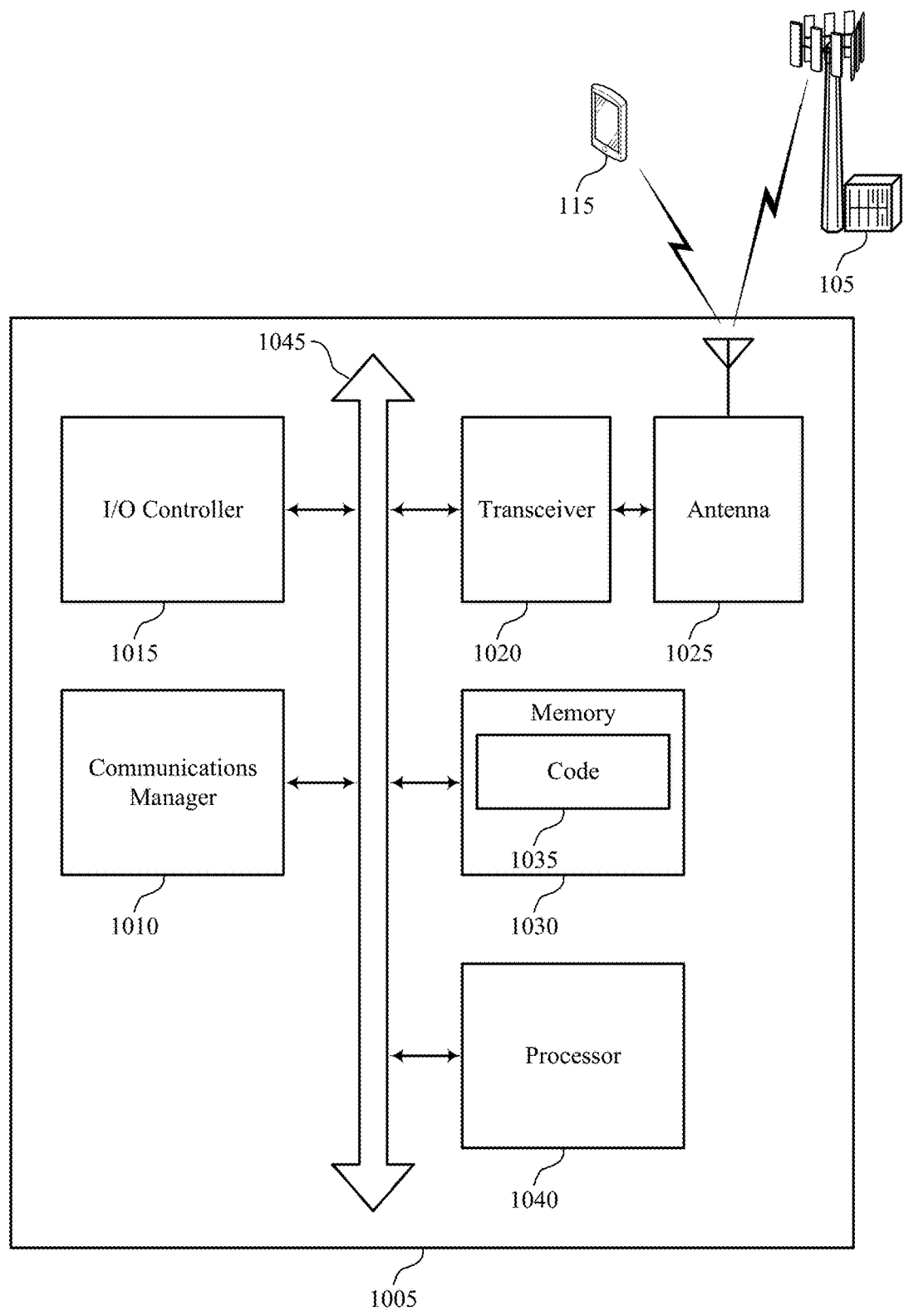
FIG. 10 shows a diagram of a system including a device that supports techniques for search space management in accordance with aspects of the present disclosure.

FIG. 10 shows a diagram of a system 1000 including a device 1005 that supports techniques for search space management in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may monitor a search space for a common physical downlink control channel associated with a transmission opportunity, identify at least one transmission beam for use by a base station during the transmission opportunity based on the common physical downlink control channel, and receive information using the at least one transmission beam during the transmission opportunity. The communications manager 1010 may also monitor, using a first periodicity, a search space for a common physical downlink control channel associated with a transmission opportunity, monitor, using the second periodicity, the search space for a second common physical downlink control channel based on identifying the second periodicity, detect the common physical downlink control channel based on monitoring the search space using the first periodicity, and identify a second periodicity for monitoring the search space based on information included in the common physical downlink control channel.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for search space management).

The code 1035 may include instructions to implement aspects of the present disclosure, including instructions to support wireless communications at a UE. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
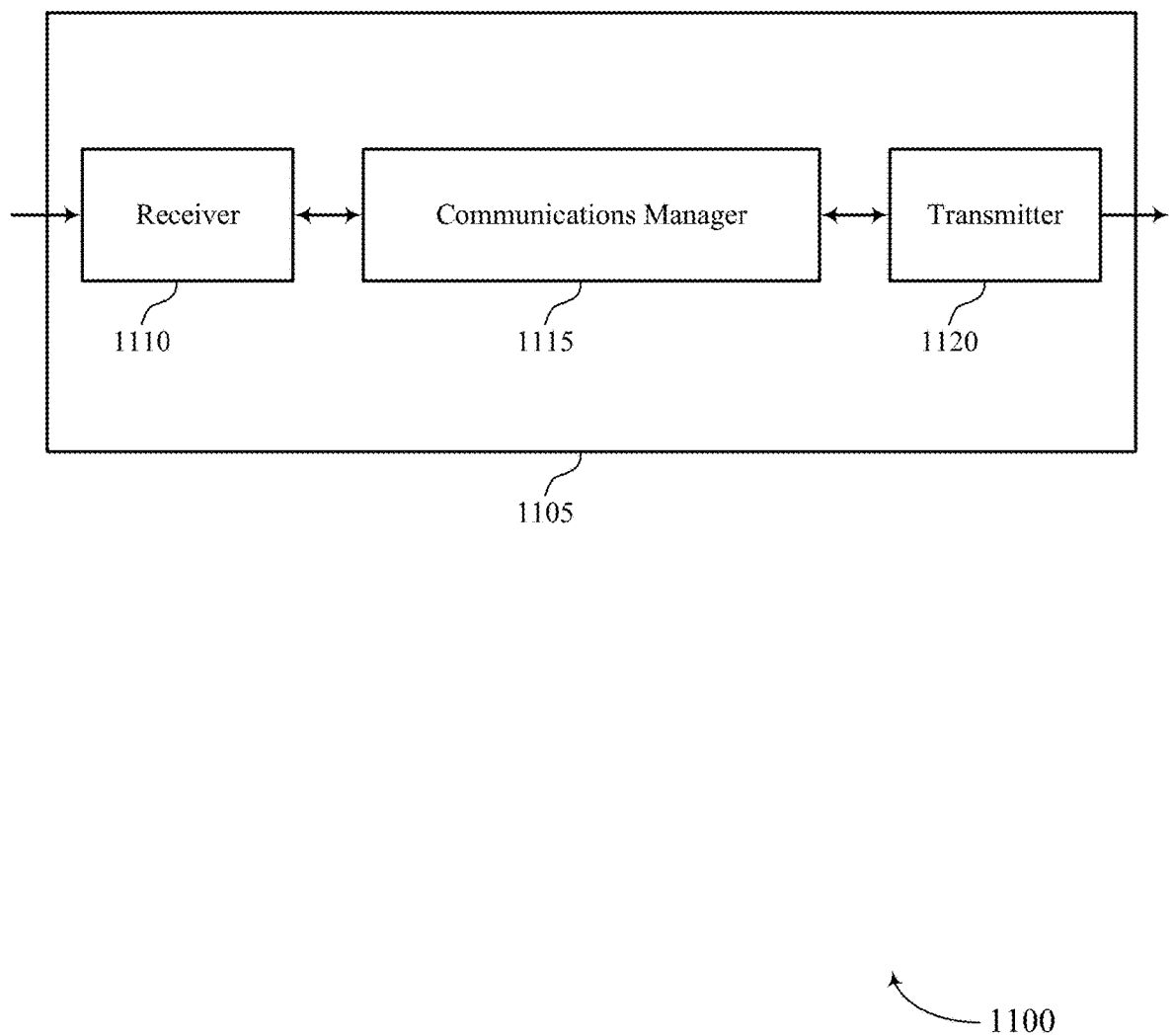
FIGS. 11 and 12 show block diagrams of devices that support techniques for search space management in accordance with aspects of the present disclosure.

FIG. 11 shows a block diagram 1100 of a device 1105 that supports techniques for search space management in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for search space management, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify at least one transmission beam and information for a transmission to a UE, transmit a common physical downlink control channel including an indication of the at least one transmission beam to the UE, and transmit the information to the UE using the at least one transmission beam during a transmission opportunity based at least in part on transmitting the common physical downlink control channel. The communications manager 1115 may also identify information for transmitting to a UE, transmit, to the UE, the information during a transmission opportunity based at least in part on transmitting the common physical downlink control channel, identify a periodicity for the UE to monitor a search space, the periodicity different than a current periodicity, and transmit, to the UE, a common physical downlink control channel that includes an indication of the periodicity. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
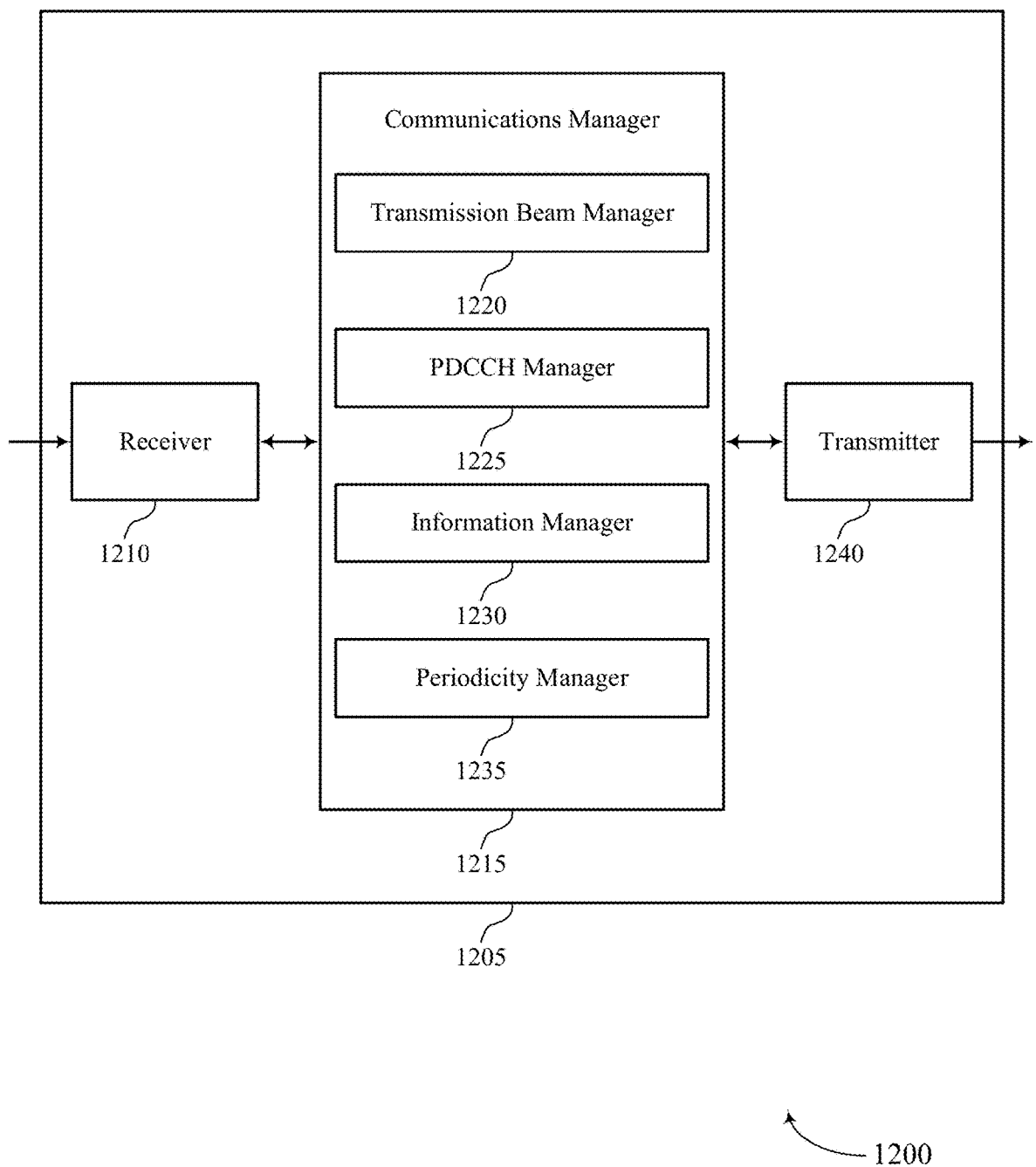

FIG. 12 shows a block diagram 1200 of a device 1205 that supports techniques for search space management in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for search space management, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a transmission beam manager 1220, a PDCCH manager 1225, an information manager 1230, and a periodicity manager 1235. The communications manager 1215 may be an example of aspects of the communications manager 1410 described herein.

The transmission beam manager 1220 may identify at least one transmission beam and information for a transmission to a UE.

The PDCCH manager 1225 may transmit a common physical downlink control channel including an indication of the at least one transmission beam to the UE. The PDCCH manager 1225 may transmit, to the UE, a common physical downlink control channel that includes an indication of the periodicity.

The information manager 1230 may transmit the information to the UE using the at least one transmission beam during a transmission opportunity based at least in part on transmitting the common physical downlink control channel.

The information manager 1230 may identify information for transmitting to a UE and transmit, to the UE, the information during a transmission opportunity based at least in part on transmitting the common physical downlink control channel.

The periodicity manager 1235 may identify a periodicity for the UE to monitor a search space, the periodicity different than a current periodicity.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
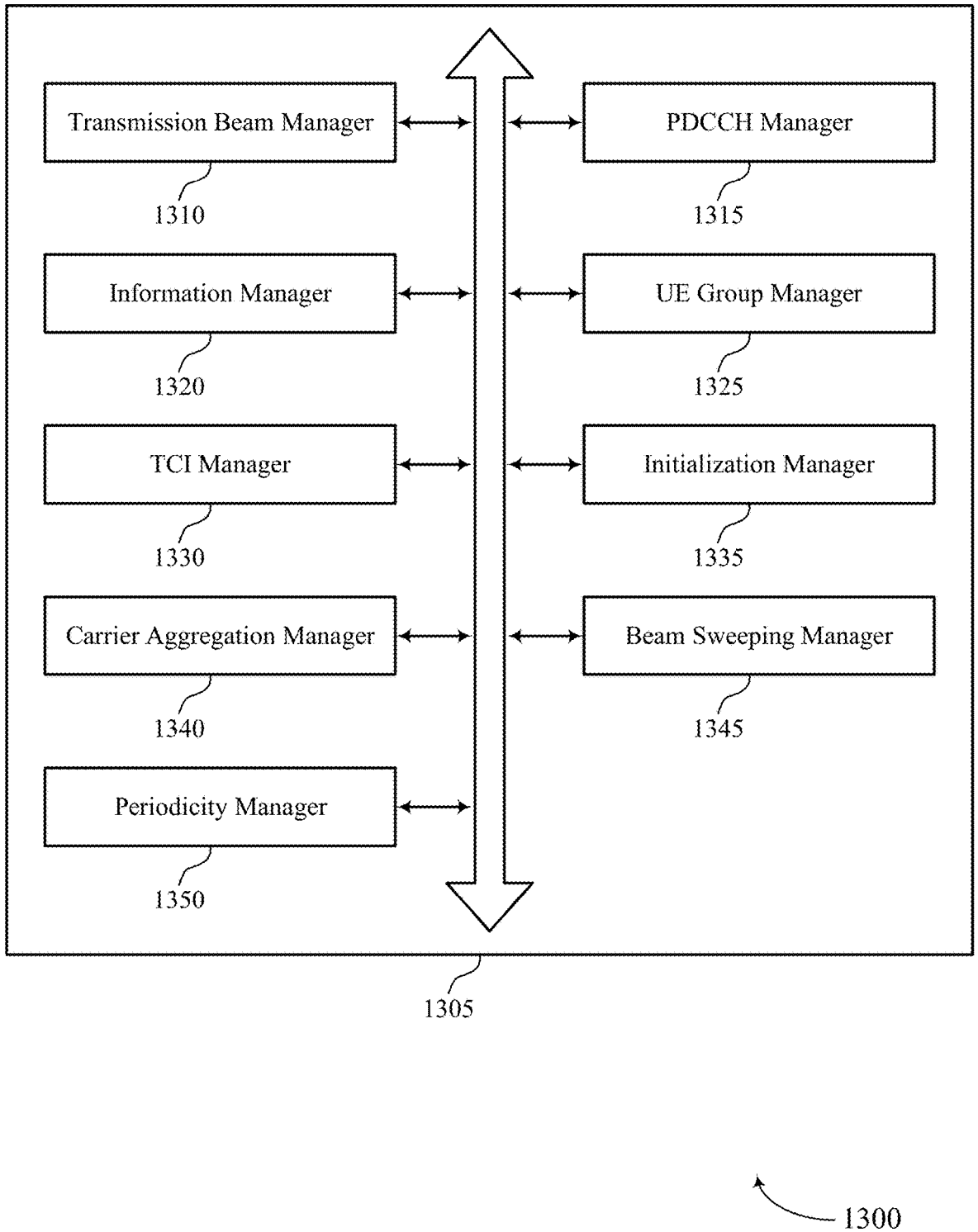
FIG. 13 shows a block diagram of a communications manager that supports techniques for search space management in accordance with aspects of the present disclosure.

FIG. 13 shows a block diagram 1300 of a communications manager 1305 that supports techniques for search space management in accordance with aspects of the present disclosure. The communications manager 1305 may be an example of aspects of a communications manager 1115, a communications manager 1215, or a communications manager 1410 described herein. The communications manager 1305 may include a transmission beam manager 1310, a PDCCH manager 1315, an information manager 1320, a UE group manager 1325, a TCI manager 1330, an initialization manager 1335, a carrier aggregation manager 1340, a beam sweeping manager 1345, and a periodicity manager 1350. Each of these modules may communicate, directly or indirectly, with one another (e.g., via one or more buses).

The transmission beam manager 1310 may identify at least one transmission beam and information for a transmission to a UE. In some examples, the transmission beam manager 1310 may identify a second transmission beam that will not be used during the transmission opportunity based on identifying the information, where the common physical downlink control channel includes an indication of the second transmission beam. In some examples, identifying at least one transmission beam for communicating the information by the base station, where the common physical downlink control channel includes a second indication of the at least one transmission beam.

The PDCCH manager 1315 may transmit a common physical downlink control channel including an indication of the at least one transmission beam to the UE. In some examples, transmitting, to the UE, a common physical downlink control channel that includes an indication of the periodicity. In some cases, the common physical downlink control channel includes an indication signal for the UE to determine whether the UE is to monitor subsequent dedicated PDCCH monitoring occasions based on identifying the at least one transmission beam included in the common physical downlink control channel. The PDCCH manager 1315 transmit the common physical downlink control channel that includes a list of a plurality of transmission beams the base station intends to use during the transmission opportunity to transmit information with a plurality of UEs.

The information manager 1320 may transmit the information to the UE using the at least one transmission beam during a transmission opportunity based at least in part on transmitting the common physical downlink control channel. In some examples, the information manager 1320 may identify information for transmitting to a UE.

In some examples, the information manager 1320 may transmit, to the UE, the information during a transmission opportunity based at least in part on transmitting the common physical downlink control channel. In some examples, determining that at least a portion of the transmission opportunity includes information for the UE, where identifying the periodicity is based on identifying that the portion of the transmission opportunity includes information for the UE. In some cases, the transmission opportunity is in the shared radio frequency spectrum.

The UE group manager 1325 may identify a group of UEs that include the UE based on identifying the information waiting to be transmitted to the UE, where the common physical downlink control channel includes an indication of the group of UEs.

The TCI manager 1330 may identify a TCI associated with the UE based on identifying the information waiting to be transmitted to the UE, where the common physical downlink control channel includes an indication of the TCI. In some examples, the TCI manager 1330 may there is a one-to-one mapping between TCIs and groups of UEs.

The initialization manager 1335 may perform an initialization procedure to associate one or more transmission beams with the UE or a group of UEs, the one or more transmission beams for use to communicate information with the UE or the group of UEs during the transmission opportunity, where identifying the at least one transmission beam is based on performing the initialization procedure.

The carrier aggregation manager 1340 may transmit the common physical downlink control channel over a primary cell, where transmitting the information includes transmitting the information over a secondary cell. In some examples, the carrier aggregation manager 1340 may transmit the information over a secondary cell. In some cases, the primary cell is a sub-6 gigahertz cell and the secondary cell is a mmW cell.

The beam sweeping manager 1345 may transmit a set of beams that include the common physical downlink control channel in a beam sweeping pattern, where transmitting the set of beams includes transmitting the common physical downlink control channel.

The periodicity manager 1350 may identify a periodicity for the UE to monitor a search space, the periodicity different than a current periodicity. In some examples, the periodicity manager 1350 may identify a periodicity for the UE to monitor a search space different than a current periodicity, where the common physical downlink control channel includes an indication of the periodicity. In some cases, the search space includes at least a portion of a control resource set. In some cases, the current periodicity includes monitoring the search space once every mini-slot. In some cases, the periodicity includes monitoring the search space once every slot.

Figure 14:
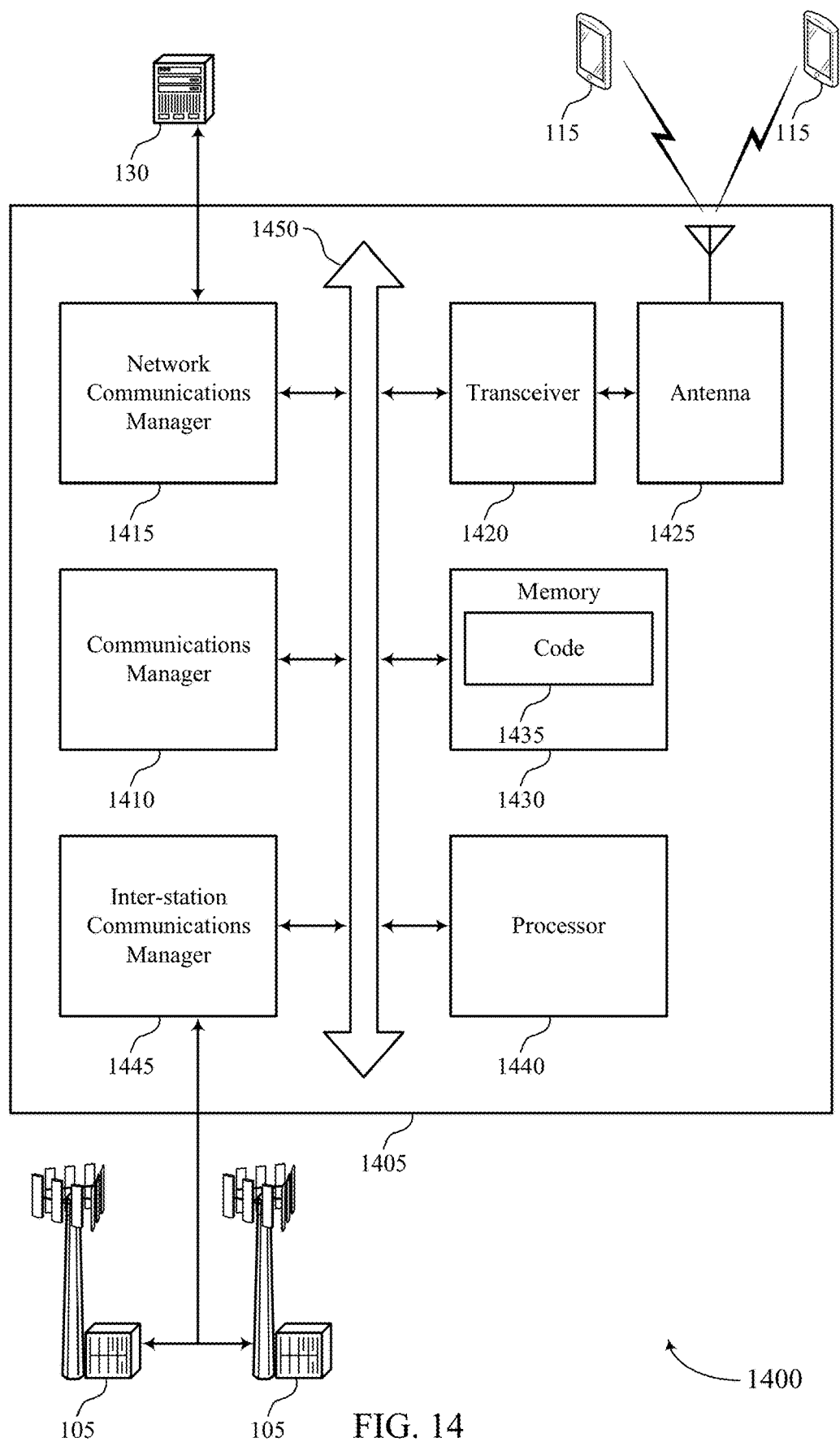
FIG. 14 shows a diagram of a system including a device that supports techniques for search space management in accordance with aspects of the present disclosure.

FIG. 14 shows a diagram of a system 1400 including a device 1405 that supports techniques for search space management in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify at least one transmission beam and information for a transmission to a UE, transmit a common physical downlink control channel including an indication of the at least one transmission beam to the UE, and transmit the information to the UE using the at least one transmission beam during a transmission opportunity based at least in part on transmitting the common physical downlink control channel. The communications manager 1410 may also identify information for transmitting to a UE, transmit, to the UE, the information during a transmission opportunity based at least in part on transmitting the common physical downlink control channel, identify a periodicity for the UE to monitor a search space, the periodicity different than a current periodicity, and transmit, to the UE, a common physical downlink control channel that includes an indication of the periodicity.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for search space management).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications at a base station. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
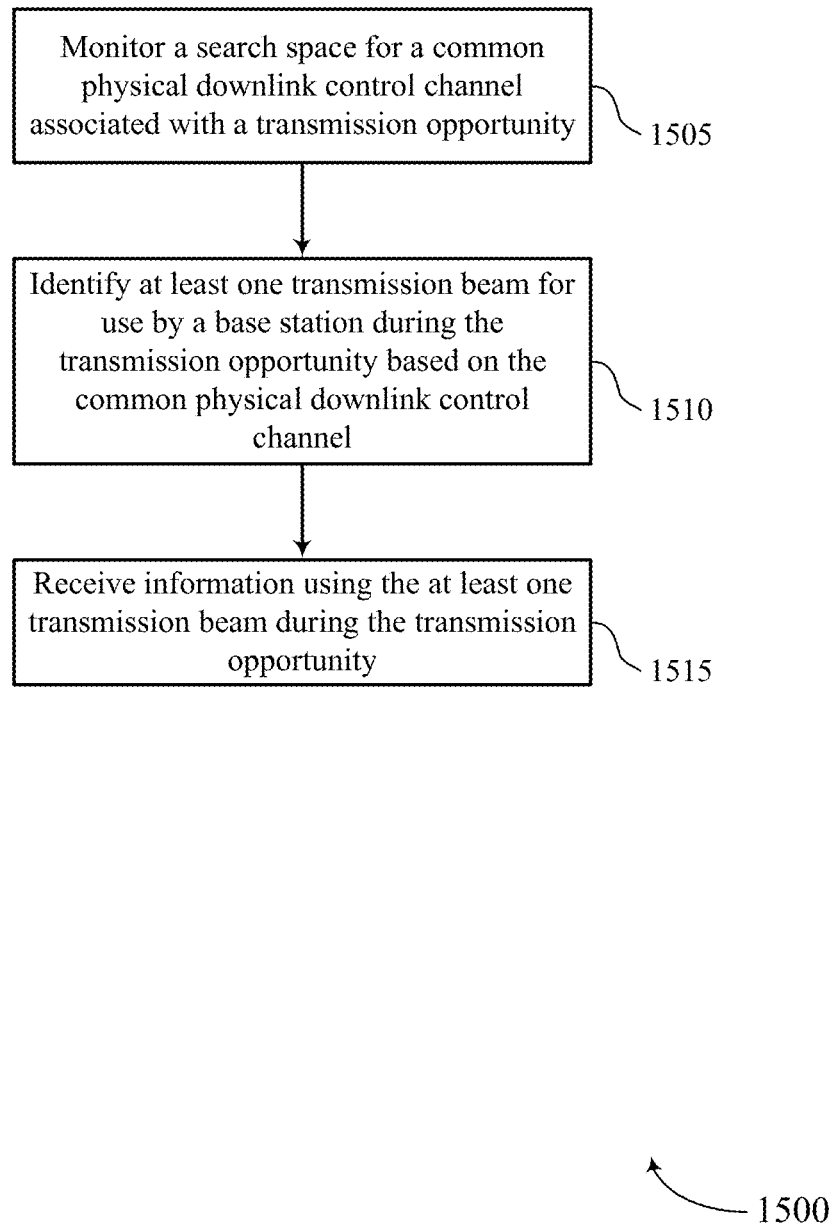
FIGS. 15 through 23 show flowcharts illustrating methods that support techniques for search space management in accordance with aspects of the present disclosure.

FIG. 15 shows a flowchart illustrating a method 1500 that supports techniques for search space management in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may monitor a search space for a common physical downlink control channel associated with a transmission opportunity. The operations of 1505 may be performed according to the methods described herein. In some examples, aspects of the operations of 1505 may be performed by a search space manager as described with reference to FIGS. 7 through 10.

At 1510, the UE may identify at least one transmission beam for use by a base station during the transmission opportunity based on the common physical downlink control channel. The operations of 1510 may be performed according to the methods described herein. In some examples, aspects of the operations of 1510 may be performed by a transmission beam manager as described with reference to FIGS. 7 through 10.

At 1515, the UE may receive information using the at least one transmission beam during the transmission opportunity. The operations of 1515 may be performed according to the methods described herein. In some examples, aspects of the operations of 1515 may be performed by an information manager as described with reference to FIGS. 7 through 10.

Figure 16:
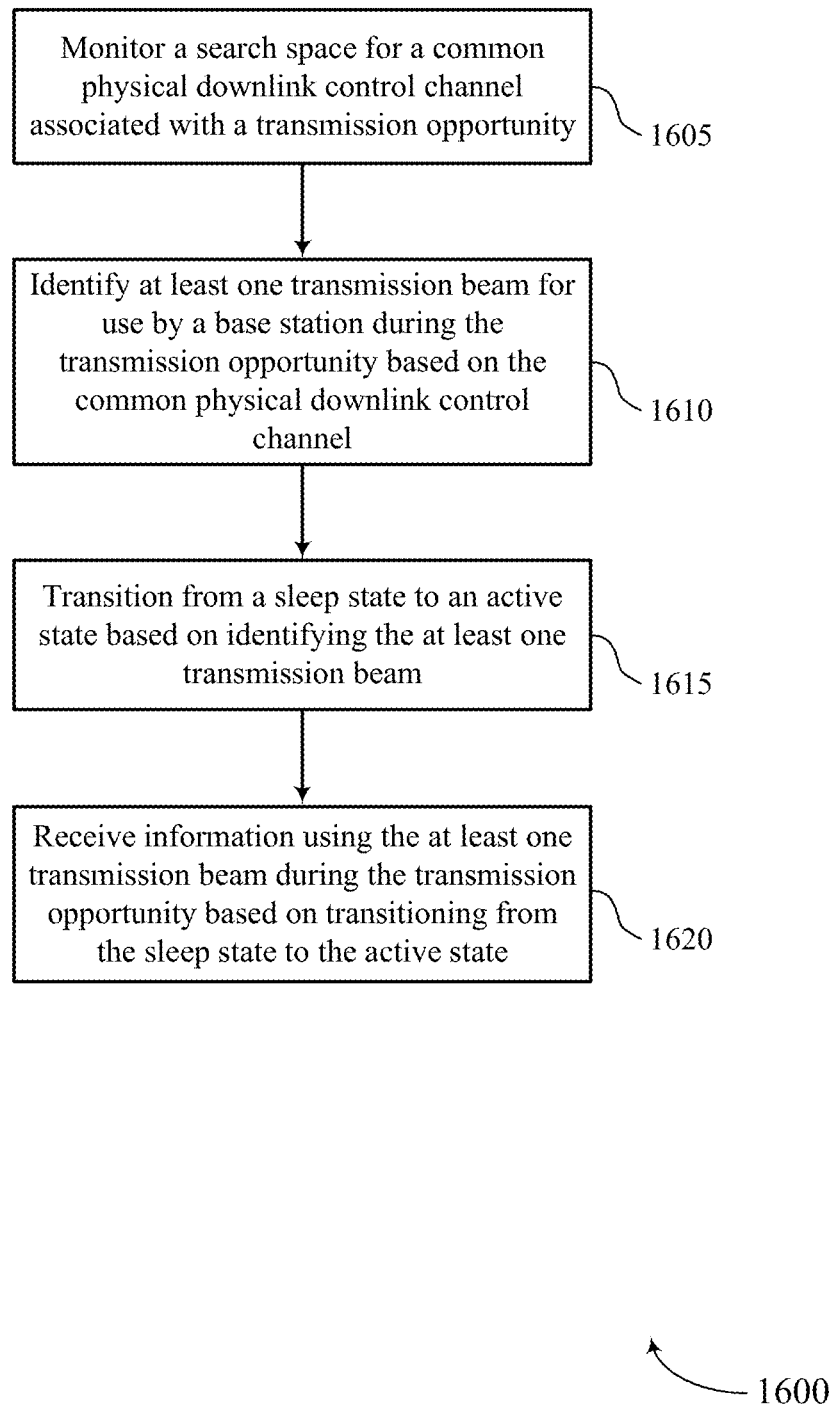

FIG. 16 shows a flowchart illustrating a method 1600 that supports techniques for search space management in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may monitor a search space for a common physical downlink control channel associated with a transmission opportunity. The operations of 1605 may be performed according to the methods described herein. In some examples, aspects of the operations of 1605 may be performed by a search space manager as described with reference to FIGS. 7 through 10.

At 1610, the UE may identify at least one transmission beam for use by a base station during the transmission opportunity based on the common physical downlink control channel. The operations of 1610 may be performed according to the methods described herein. In some examples, aspects of the operations of 1610 may be performed by a transmission beam manager as described with reference to FIGS. 7 through 10.

At 1615, the UE may transition from a sleep state to an active state based on identifying the at least one transmission beam. The operations of 1615 may be performed according to the methods described herein. In some examples, aspects of the operations of 1615 may be performed by a sleep state manager as described with reference to FIGS. 7 through 10.

At 1620, the UE may receive information using the at least one transmission beam during the transmission opportunity based on transitioning from the sleep state to the active state. The operations of 1620 may be performed according to the methods described herein. In some examples, aspects of the operations of 1620 may be performed by an information manager as described with reference to FIGS. 7 through 10.

Figure 17:
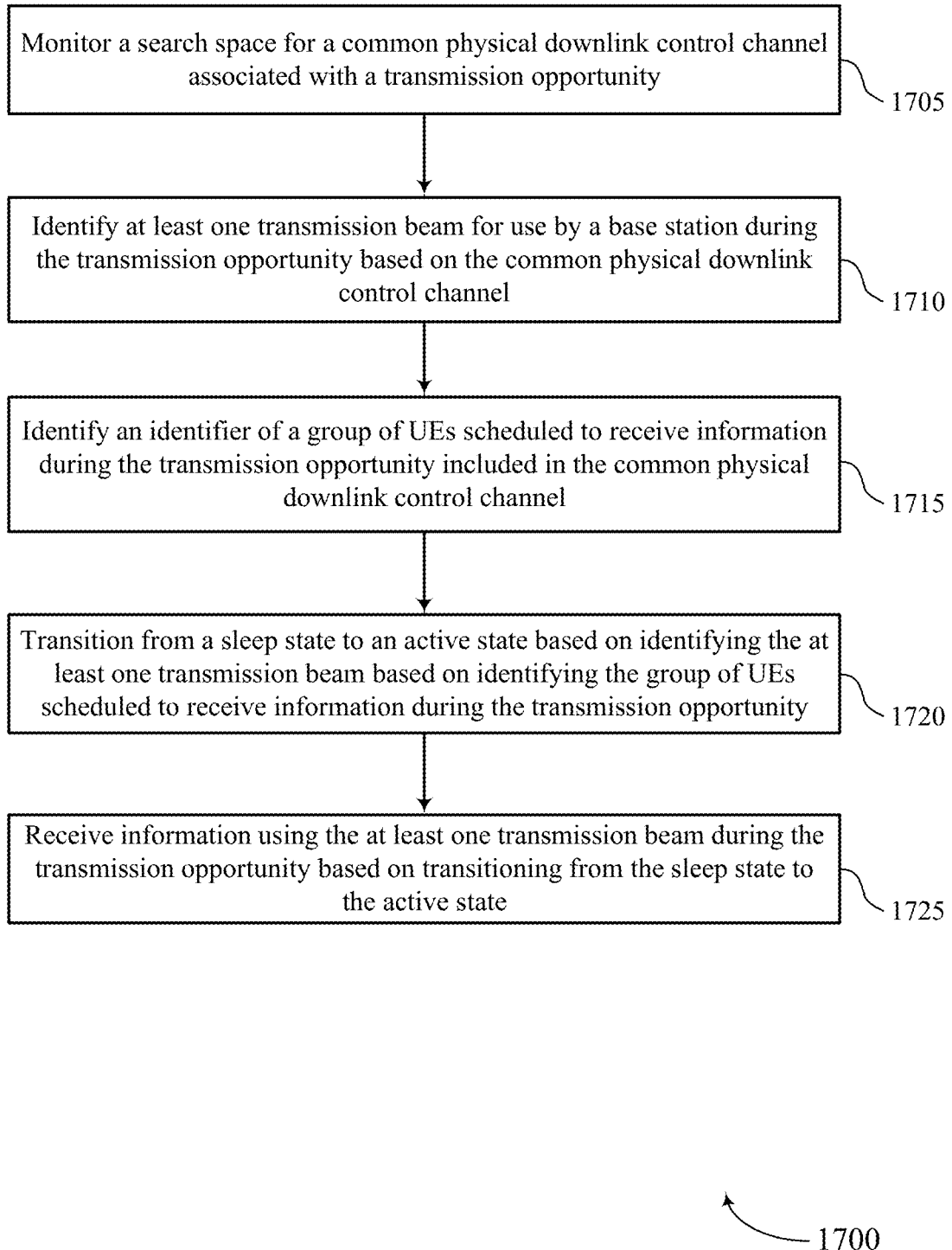

FIG. 17 shows a flowchart illustrating a method 1700 that supports techniques for search space management in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may monitor a search space for a common physical downlink control channel associated with a transmission opportunity. The operations of 1705 may be performed according to the methods described herein. In some examples, aspects of the operations of 1705 may be performed by a search space manager as described with reference to FIGS. 7 through 10.

At 1710, the UE may identify at least one transmission beam for use by a base station during the transmission opportunity based on the common physical downlink control channel. The operations of 1710 may be performed according to the methods described herein. In some examples, aspects of the operations of 1710 may be performed by a transmission beam manager as described with reference to FIGS. 7 through 10.

At 1715, the UE may identify an identifier of a group of UEs scheduled to receive information during the transmission opportunity included in the common physical downlink control channel. The operations of 1715 may be performed according to the methods described herein. In some examples, aspects of the operations of 1715 may be performed by a UE group manager as described with reference to FIGS. 7 through 10.

At 1720, the UE may transition from a sleep state to an active state based on identifying the at least one transmission beam based on identifying the group of UEs scheduled to receive information during the transmission opportunity. The operations of 1720 may be performed according to the methods described herein. In some examples, aspects of the operations of 1720 may be performed by a sleep state manager as described with reference to FIGS. 7 through 10.

At 1725, the UE may receive information using the at least one transmission beam during the transmission opportunity based on transitioning from the sleep state to the active state. The operations of 1725 may be performed according to the methods described herein. In some examples, aspects of the operations of 1725 may be performed by an information manager as described with reference to FIGS. 7 through 10.

Figure 18:
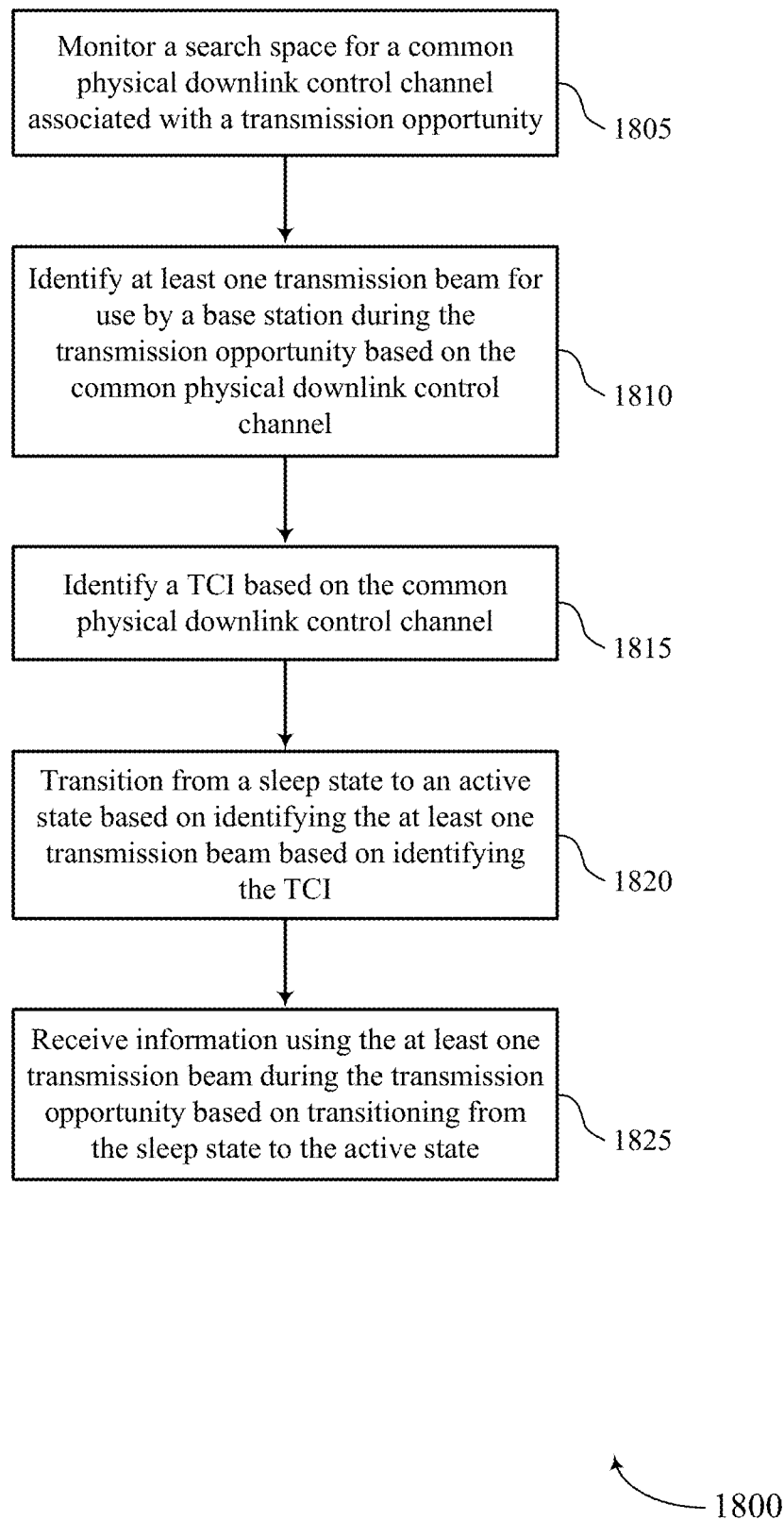

FIG. 18 shows a flowchart illustrating a method 1800 that supports techniques for search space management in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1805, the UE may monitor a search space for a common physical downlink control channel associated with a transmission opportunity. The operations of 1805 may be performed according to the methods described herein. In some examples, aspects of the operations of 1805 may be performed by a search space manager as described with reference to FIGS. 7 through 10.

At 1810, the UE may identify at least one transmission beam for use by a base station during the transmission opportunity based on the common physical downlink control channel. The operations of 1810 may be performed according to the methods described herein. In some examples, aspects of the operations of 1810 may be performed by a transmission beam manager as described with reference to FIGS. 7 through 10.

At 1815, the UE may identify a TCI based on the common physical downlink control channel. The operations of 1815 may be performed according to the methods described herein. In some examples, aspects of the operations of 1815 may be performed by a TCI manager as described with reference to FIGS. 7 through 10.

At 1820, the UE may transition from a sleep state to an active state based on identifying the at least one transmission beam based on identifying the TCI. The operations of 1820 may be performed according to the methods described herein. In some examples, aspects of the operations of 1820 may be performed by a sleep state manager as described with reference to FIGS. 7 through 10.

At 1825, the UE may receive information using the at least one transmission beam during the transmission opportunity based on transitioning from the sleep state to the active state. The operations of 1825 may be performed according to the methods described herein. In some examples, aspects of the operations of 1825 may be performed by an information manager as described with reference to FIGS. 7 through 10.

Figure 19:
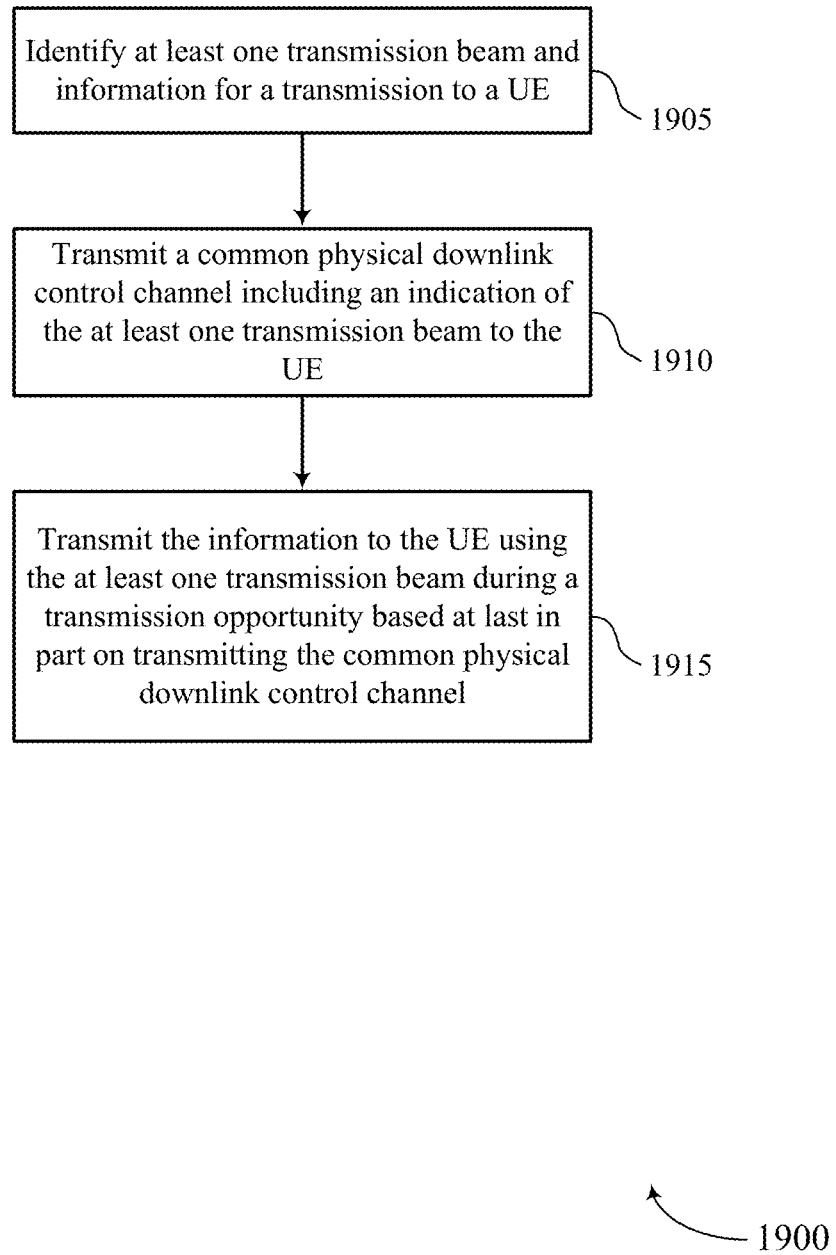

FIG. 19 shows a flowchart illustrating a method 1900 that supports techniques for search space management in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may identify at least one transmission beam and information for a transmission to a UE. In some cases, the base station may identify a plurality of transmission beams, at least one for each of the UEs the base station intends to schedule during a transmission opportunity. The operations of 1905 may be performed according to the methods described herein. In some examples, aspects of the operations of 1905 may be performed by a transmission beam manager as described with reference to FIGS. 11 through 14.

At 1910, the base station may transmit a common physical downlink control channel including an indication of the at least one transmission beam to the UE. In some cases, the common physical downlink control channel may include a list of the plurality of transmission beams the base station intends to use during the transmission opportunity. The operations of 1910 may be performed according to the methods described herein. In some examples, aspects of the operations of 1910 may be performed by a PDCCH manager as described with reference to FIGS. 11 through 14.

At 1915, the base station may transmit the information to the UE using the at least one transmission beam during a transmission opportunity based at least in part on transmitting the common physical downlink control channel. The operations of 1915 may be performed according to the methods described herein. In some examples, aspects of the operations of 1915 may be performed by an information manager as described with reference to FIGS. 11 through 14.

Figure 20:
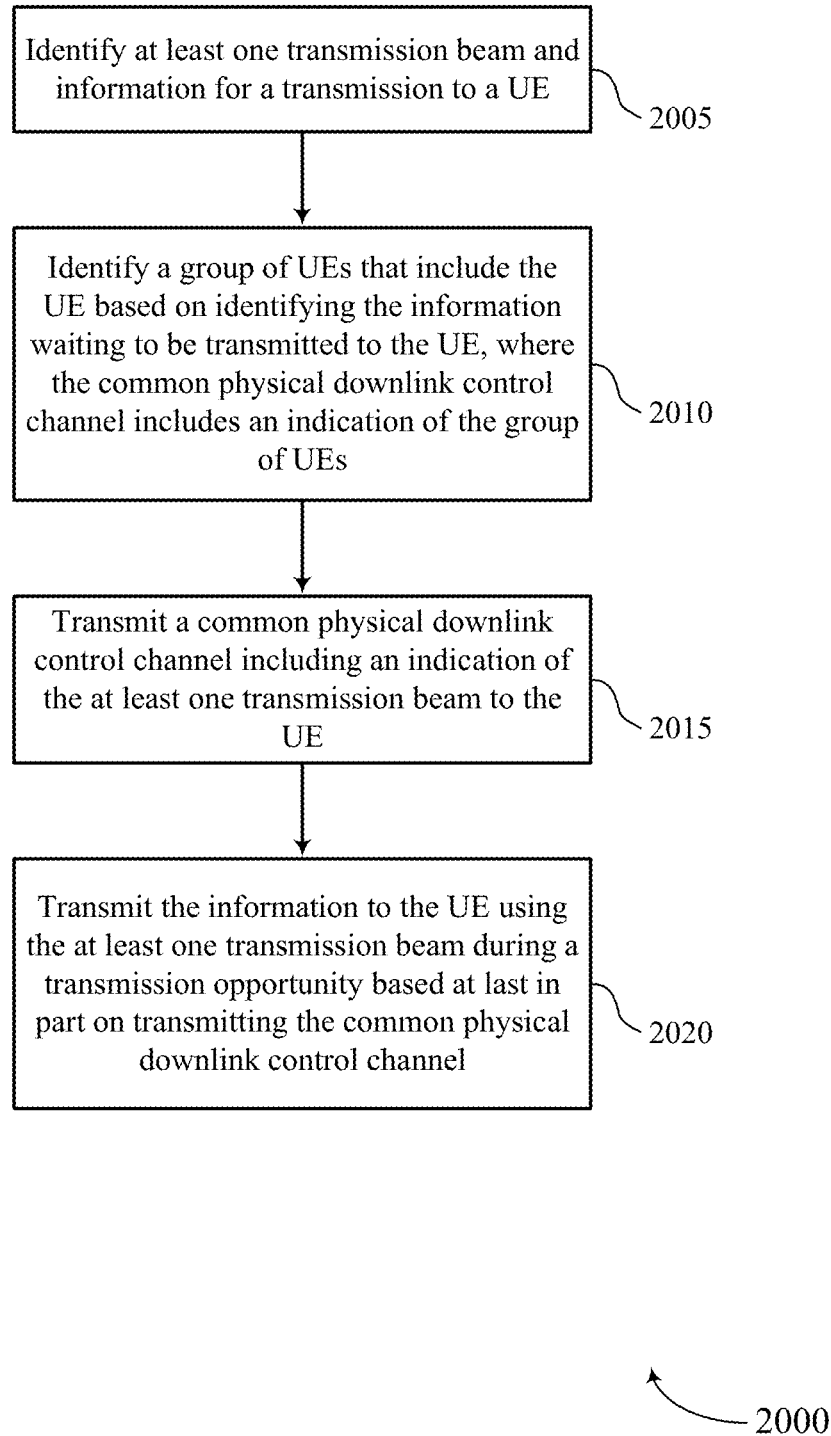

FIG. 20 shows a flowchart illustrating a method 2000 that supports techniques for search space management in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2005, the base station may identify at least one transmission beam and information for a transmission to a UE. The operations of 2005 may be performed according to the methods described herein. In some examples, aspects of the operations of 2005 may be performed by a transmission beam manager as described with reference to FIGS. 11 through 14.

At 2010, the base station may identify a group of UEs that include the UE based on identifying the information waiting to be transmitted to the UE, where the common physical downlink control channel includes an indication of the group of UEs. The operations of 2010 may be performed according to the methods described herein. In some examples, aspects of the operations of 2010 may be performed by a UE group manager as described with reference to FIGS. 11 through 14.

At 2015, the base station may transmit a common physical downlink control channel including an indication of the at least one transmission beam to the UE. The operations of 2015 may be performed according to the methods described herein. In some examples, aspects of the operations of 2015 may be performed by a PDCCH manager as described with reference to FIGS. 11 through 14.

At 2020, the base station may transmit the information to the UE using the at least one transmission beam during a transmission opportunity based at least in part on transmitting the common physical downlink control channel. The operations of 2020 may be performed according to the methods described herein. In some examples, aspects of the operations of 2020 may be performed by an information manager as described with reference to FIGS. 11 through 14.

Figure 21:
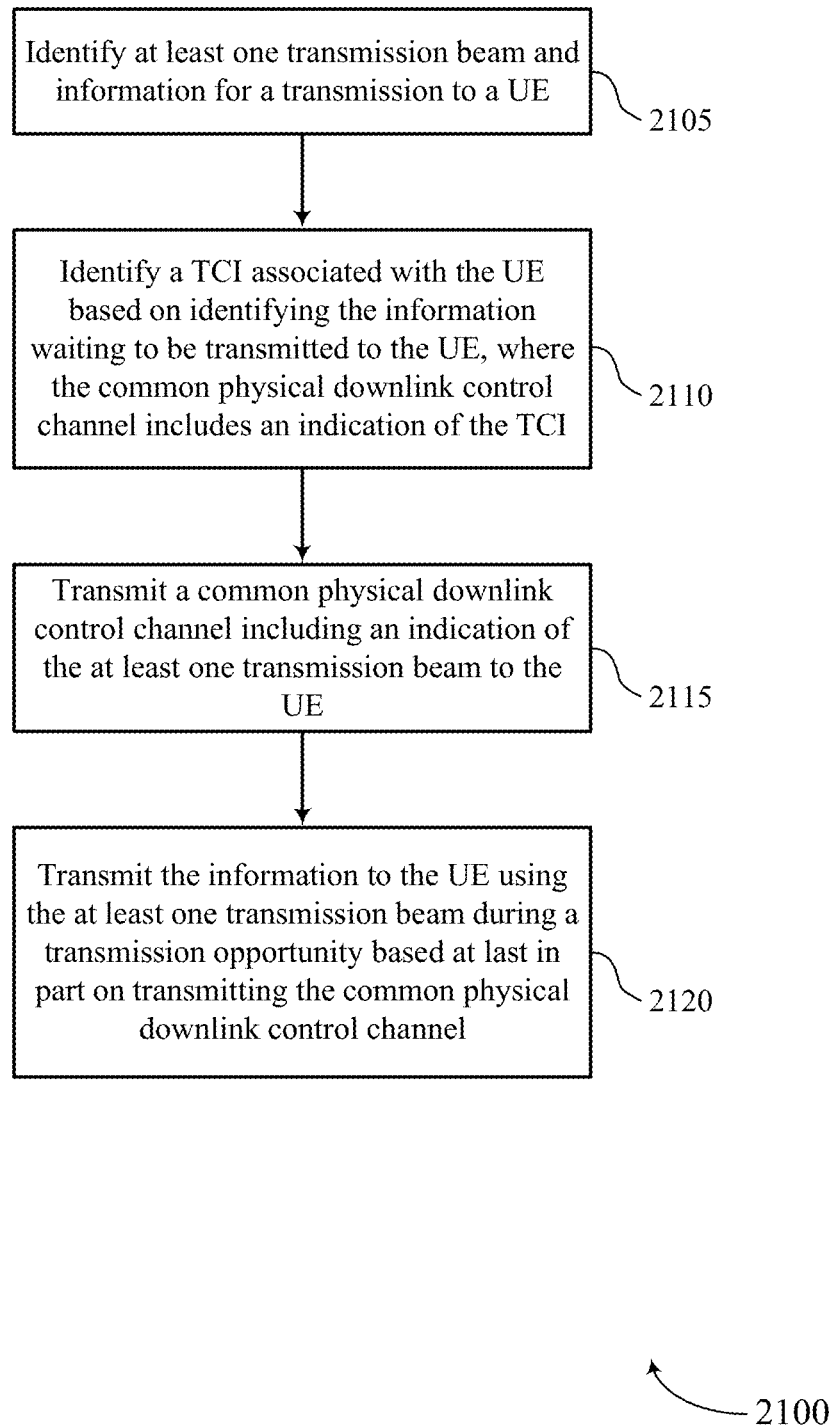

FIG. 21 shows a flowchart illustrating a method 2100 that supports techniques for search space management in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2105, the base station may identify at least one transmission beam and information for a transmission to a UE. In some cases, the base station may identify a plurality of transmission beams, at least one for each of the UEs the base station intends to schedule during a transmission opportunity. The operations of 2105 may be performed according to the methods described herein. In some examples, aspects of the operations of 2105 may be performed by a transmission beam manager as described with reference to FIGS. 11 through 14.

At 2110, the base station may identify a TCI associated with the UE based on identifying the information waiting to be transmitted to the UE, where the common physical downlink control channel includes an indication of the TCI. In some cases, the common physical downlink control channel may include a list of the plurality of transmission beams the base station intends to use during the transmission opportunity. The operations of 2110 may be performed according to the methods described herein. In some examples, aspects of the operations of 2110 may be performed by a TCI manager as described with reference to FIGS. 11 through 14.

At 2115, the base station may transmit a common physical downlink control channel including an indication of the at least one transmission beam to the UE. The operations of 2115 may be performed according to the methods described herein. In some examples, aspects of the operations of 2115 may be performed by a PDCCH manager as described with reference to FIGS. 11 through 14.

At 2120, the base station may transmit the information to the UE using the at least one transmission beam during a transmission opportunity based at least in part on transmitting the common physical downlink control channel. The operations of 2120 may be performed according to the methods described herein. In some examples, aspects of the operations of 2120 may be performed by an information manager as described with reference to FIGS. 11 through 14.

Figure 22:
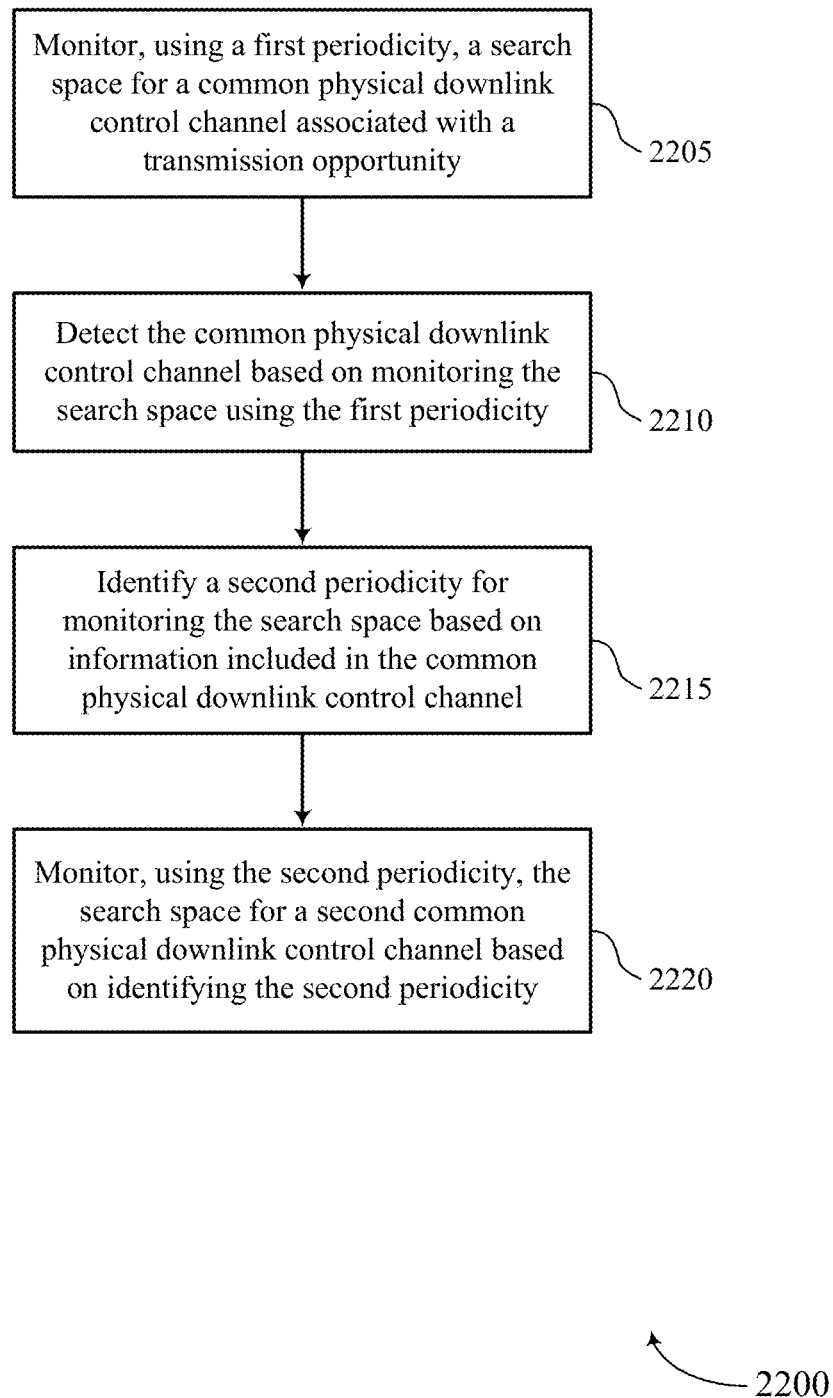

FIG. 22 shows a flowchart illustrating a method 2200 that supports techniques for search space management in accordance with aspects of the present disclosure. The operations of method 2200 may be implemented by a UE 115 or its components as described herein. For example, the operations of method 2200 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 2205, the UE may monitor, using a first periodicity, a search space for a common physical downlink control channel associated with a transmission opportunity. The operations of 2205 may be performed according to the methods described herein. In some examples, aspects of the operations of 2205 may be performed by a search space manager as described with reference to FIGS. 7 through 10.

At 2210, the UE may detect the common physical downlink control channel based on monitoring the search space using the first periodicity. The operations of 2210 may be performed according to the methods described herein. In some examples, aspects of the operations of 2210 may be performed by a PDCCH manager as described with reference to FIGS. 7 through 10.

At 2215, the UE may identify a second periodicity for monitoring the search space based on information included in the common physical downlink control channel. The operations of 2215 may be performed according to the methods described herein. In some examples, aspects of the operations of 2215 may be performed by a periodicity manager as described with reference to FIGS. 7 through 10.

At 2220, the UE may monitor, using the second periodicity, the search space for a second common physical downlink control channel based on identifying the second periodicity. The operations of 2220 may be performed according to the methods described herein. In some examples, aspects of the operations of 2220 may be performed by a search space manager as described with reference to FIGS. 7 through 10.

Figure 23:
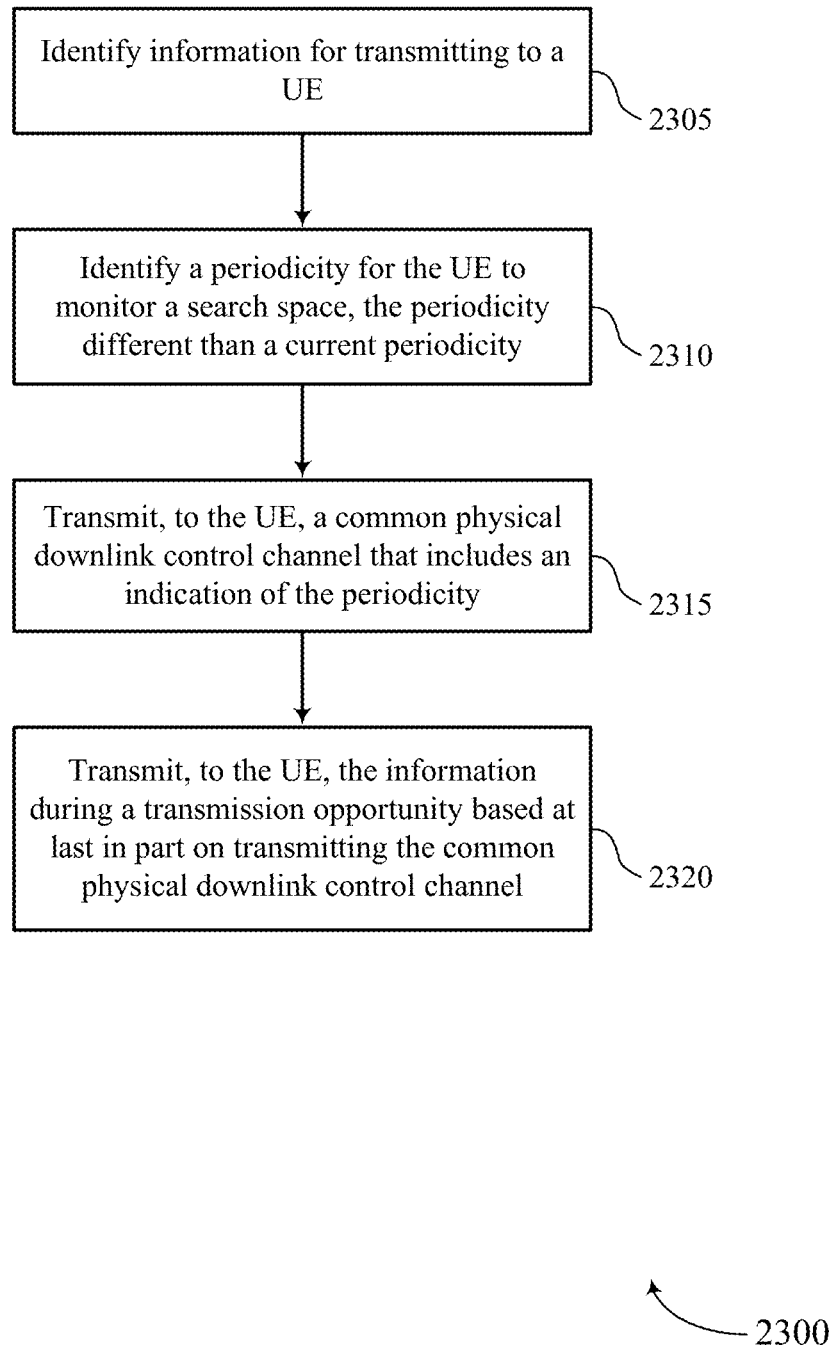

FIG. 23 shows a flowchart illustrating a method 2300 that supports techniques for search space management in accordance with aspects of the present disclosure. The operations of method 2300 may be implemented by a base station 105 or its components as described herein. For example, the operations of method 2300 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2305, the base station may identify information for transmitting to a UE. In some cases, the base station may identify information for transmitting to a plurality of UEs.

The operations of 2305 may be performed according to the methods described herein. In some examples, aspects of the operations of 2305 may be performed by an information manager as described with reference to FIGS. 11 through 14.

At 2310, the base station may identify a periodicity for the UE to monitor a search space, the periodicity different than a current periodicity. In some cases, the base station may identify a periodicity for the plurality of UEs to monitor the search space, the periodicity different than a current periodicity. The operations of 2310 may be performed according to the methods described herein. In some examples, aspects of the operations of 2310 may be performed by a periodicity manager as described with reference to FIGS. 11 through 14.

At 2315, the base station may transmit, to the UE, a common physical downlink control channel that includes an indication of the periodicity. In some cases, the base station may transmit, to the plurality of UEs, the common physical downlink control channel that includes an indication of the periodicity. The operations of 2315 may be performed according to the methods described herein. In some examples, aspects of the operations of 2315 may be performed by a PDCCH manager as described with reference to FIGS. 11 through 14.

At 2320, the base station may transmit, to the UE, the information during a transmission opportunity based at least in part on transmitting the common physical downlink control channel. The operations of 2320 may be performed according to the methods described herein. In some examples, aspects of the operations of 2320 may be performed by an information manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    monitoring a search space for a common physical downlink control channel associated with a transmission opportunity;
    identifying at least one transmission beam associated with the UE for use by a base station during the transmission opportunity, the identifying based at least in part on the common physical downlink control channel; and
    receiving information using the at least one transmission beam during the transmission opportunity.

2. The method of claim 1, further comprising:
    transitioning from a sleep state to an active state based at least in part on identifying the at least one transmission beam, wherein receiving the information is based at least in part on transitioning from the sleep state to the active state.

3. The method of claim 2, further comprising:
    determining that the at least one transmission beam is to be used to communicate information with the UE during the transmission opportunity, wherein transitioning from the sleep state to the active state is based at least in part on determining that the at least one transmission beam is to be used to communicate information with the UE during the transmission opportunity.

4. The method of claim 2, further comprising:
    identifying an identifier of a group of UEs scheduled to receive information during the transmission opportunity included in the common physical downlink control channel, wherein transitioning from the sleep state to the active state is based at least in part on identifying the group of UEs scheduled to receive information during the transmission opportunity.

5. The method of claim 2, further comprising:
    identifying a transmission configuration indicator (TCI) based at least in part on the common physical downlink control channel, wherein transitioning from the sleep state to the active state is based at least in part on identifying the TCI.

6. The method of claim 5, further comprising:
    identifying a group of UEs scheduled to receive information during the transmission opportunity based at least in part on the TCI included in the common physical downlink control channel, wherein identifying the at least one transmission beam is based at least in part on identifying the group of UEs scheduled to receive information during the transmission opportunity.

7. The method of claim 1, further comprising:
    monitoring a second search space associated with the transmission opportunity based at least in part on identifying the at least one transmission beam, wherein receiving the information using the at least one transmission beam during the transmission opportunity is based at least in part on monitoring the second search space.

8. The method of claim 7, wherein monitoring the second search space comprises:
dynamically activating at least a portion of the UE based at least in part on the common physical downlink control channel.

9. The method of claim 1, wherein monitoring the search space comprises:
monitoring the search space on a primary cell, the method further comprising; and
tuning, for a secondary cell, a receiver of the UE based at least in part on monitoring the search space on the primary cell, wherein receiving the information using the at least one transmission beam during the transmission opportunity is based at least in part on tuning, for the secondary cell, the receiver of the UE.

10. The method of claim 9, wherein the primary cell is a sub 6 gigahertz cell and the secondary cell is a millimeter wave (mmW) cell.

11. The method of claim 1, further comprising:
receiving a plurality of beams that include the common physical downlink control channel based at least in part on monitoring the search space, wherein identifying the at least one transmission beam is based at least in part on receiving at least one of the plurality of beams that includes the common physical downlink control channel.

12. The method of claim 1, further comprising:
identifying a periodicity for monitoring the search space different than a current periodicity for monitoring the search space based at least in part on the common physical downlink control channel; and
monitoring a second search space based at least in part on identifying the periodicity.

13. The method of claim 1, further comprising:
receiving the common physical downlink control channel based at least in part on monitoring the search space, wherein identifying the at least one transmission beam is based at least in part on receiving the common physical downlink control channel; or
entering, by the UE, a sleep state to conserve power, wherein monitoring the search space is based at least in part on entering the sleep state.

14. The method of claim 1, further comprising:
identifying a second transmission beam that will not be used by the base station during the transmission opportunity based at least in part on the common physical downlink control channel;
determining that the second transmission beam is associated with the UE; and
transitioning from an active state to a sleep state based at least in part on identifying the second transmission beam that will not be used by the base station during the transmission opportunity and determining that the second transmission beam is associated with the UE.

15. A method for wireless communication by a base station, comprising:
identifying at least one transmission beam and information for a transmission to a user equipment (UE);
transmitting a common physical downlink control channel comprising an indication of the at least one transmission beam to the UE; and
transmitting the information to the UE using the at least one transmission beam during a transmission opportunity based at least in part on transmitting the common physical downlink control channel.

16. The method of claim 15, wherein the common physical downlink control channel comprises an indication signal for the UE to determine whether the UE is to monitor subsequent dedicated PDCCH monitoring occasions based at least in part on identifying the at least one transmission beam included in the common physical downlink control channel.

17. The method of claim 15, further comprising:
identifying a group of UEs that comprise the UE based at least in part on identifying the information waiting to be transmitted to the UE, wherein the common physical downlink control channel comprises an indication of the group of UEs.

18. The method of claim 15, further comprising:
identifying a transmission configuration indicator (TCI) associated with the UE based at least in part on identifying the information waiting to be transmitted to the UE, wherein the common physical downlink control channel comprises an indication of the TCI.

19. The method of claim 15, further comprising:
performing an initialization procedure to associate one or more transmission beams with the UE or a group of UEs, the one or more transmission beams for use to communicate information with the UE or the group of UEs during the transmission opportunity, wherein identifying the at least one transmission beam is based at least in part on performing the initialization procedure.

20. The method of claim 15, wherein transmitting the common physical downlink control channel comprises:
transmitting the common physical downlink control channel that includes a list of a plurality of transmission beams the base station intends to use during the transmission opportunity to transmit information with a plurality of UEs.

21. The method of claim 15, wherein transmitting the common physical downlink control channel comprises:
transmitting the common physical downlink control channel over a primary cell, and wherein transmitting the information comprises:
transmitting the information over a secondary cell.

22. The method of claim 21, wherein the primary cell is a sub 6 gigahertz cell and the secondary cell is a millimeter wave (mmW) cell.

23. The method of claim 15, further comprising:
transmitting a plurality of beams that include the common physical downlink control channel in a beam sweeping pattern, wherein transmitting the plurality of beams comprises transmitting the common physical downlink control channel; or
identifying a periodicity for the UE to monitor a search space different than a current periodicity, wherein the common physical downlink control channel includes an indication of the periodicity.

24. A method for wireless communication at a user equipment (UE), comprising:
monitoring, using a first periodicity, a search space for a common physical downlink control channel associated with a transmission opportunity;
detecting the common physical downlink control channel based at least in part on monitoring the search space using the first periodicity;
identifying a second periodicity for monitoring the search space based at least in part on information included in the common physical downlink control channel; and monitoring, using the second periodicity, the search space for a second common physical downlink control channel based at least in part on identifying the second periodicity.

25. The method of claim 24, further comprising:
determining that a duration since the common physical downlink control channel is detected satisfies a threshold, wherein identifying the second periodicity is based at least in part on the duration satisfying the threshold.

26. The method of claim 24, further comprising:
determining that at least a portion of the transmission opportunity includes information for the UE, wherein identifying the second periodicity is based at least in part on identifying that the portion of the transmission opportunity includes information for the UE.

27. The method of claim 24, wherein detecting the common physical downlink control channel comprises:
detecting that the common physical downlink control channel indicates the second periodicity.

28. A method for wireless communication at a base station, comprising:
identifying information for transmitting to a user equipment (UE);
identifying a periodicity for the UE to monitor a search space, the periodicity different than a current periodicity;
transmitting, to the UE, a common physical downlink control channel that comprises an indication of the periodicity; and
transmitting, to the UE, the information during a transmission opportunity based at least in part on transmitting the common physical downlink control channel.

29. The method of claim 28, further comprising:
identifying at least one transmission beam for communicating the information by the base station, wherein the common physical downlink control channel comprises a second indication of the at least one transmission beam.

30. The method of claim 28, further comprising:
determining that at least a portion of the transmission opportunity comprises information for the UE, wherein identifying the periodicity is based at least in part on identifying that the portion of the transmission opportunity comprises information for the UE.

* * * * *